United States Patent
Young et al.

(10) Patent No.: US 12,276,462 B2
(45) Date of Patent: Apr. 15, 2025

(54) THREE SECTION CONFIGURATION FOR COMPRESSED AIR ENERGY STORAGE SYSTEMS

(71) Applicant: Hydrostor Inc., Toronto (CA)

(72) Inventors: Davin Young, Toronto (CA); Lucas Thexton, Toronto (CA); Cameron Lewis, Toronto (CA)

(73) Assignee: Hydrostor Inc., Toronto (CA)

( * ) Notice: Subject to any disclaimer, the term of this patent is extended or adjusted under 35 U.S.C. 154(b) by 422 days.

(21) Appl. No.: 17/429,155

(22) PCT Filed: Feb. 7, 2020

(86) PCT No.: PCT/CA2020/050169
§ 371 (c)(1),
(2) Date: Aug. 6, 2021

(87) PCT Pub. No.: WO2020/160681
PCT Pub. Date: Aug. 13, 2020

(65) Prior Publication Data
US 2022/0196341 A1    Jun. 23, 2022

Related U.S. Application Data

(60) Provisional application No. 62/802,746, filed on Feb. 8, 2019.

(51) Int. Cl.
*F28D 20/00* (2006.01)
*B65G 5/00* (2006.01)
(Continued)

(52) U.S. Cl.
CPC ........... *F28D 20/0034* (2013.01); *B65G 5/00* (2013.01); *F02C 6/003* (2013.01); *F02C 6/16* (2013.01);
(Continued)

(58) Field of Classification Search
CPC ......... F28D 20/0034; F28D 2020/0078; B65G 5/00; F02C 6/003; F02C 6/16;
(Continued)

(56) References Cited

U.S. PATENT DOCUMENTS 1,382,569 A    6/1921    Godfrey
2,749,714 A    6/1956    Hunter
(Continued)

FOREIGN PATENT DOCUMENTS

AU    2006233241    5/2007
CA       1073223    3/1980
(Continued)

OTHER PUBLICATIONS

Office Action dated Jan. 5, 2022 for Japanese Application No. 2019-562449.
(Continued)

*Primary Examiner* — Eric S Ruppert
*Assistant Examiner* — Hans R Weiland
(74) *Attorney, Agent, or Firm* — Young Basile Hanlon & MacFarlane, P.C.

(57) ABSTRACT

A method of temporarily storing thermal energy via a thermal storage subsystem in a compressed air energy storage system comprising an accumulator disposed at least 300 m underground and having an interior configured to contain compressed air at an accumulator pressure that is at least 20 bar and a gas compressor/expander subsystem in communication with the accumulator via an air flow path for conveying compressed air to the accumulator when in a charging mode and from the accumulator when in a discharging mode.

23 Claims, 9 Drawing Sheets

(51) Int. Cl.
*F02C 6/00* (2006.01)
*F02C 6/16* (2006.01)
*F04B 41/02* (2006.01)
*F17C 1/00* (2006.01)
*F17C 5/06* (2006.01)

(52) U.S. Cl.
CPC .............. *F04B 41/02* (2013.01); *F17C 1/007* (2013.01); *F17C 5/06* (2013.01); *F05D 2260/213* (2013.01); *F05D 2260/42* (2013.01); *F17C 2221/031* (2013.01); *F17C 2223/0123* (2013.01); *F17C 2270/0581* (2013.01); *F28D 2020/0078* (2013.01); *Y02E 60/14* (2013.01)

(58) Field of Classification Search
CPC .. F04B 41/02; F17C 1/007; F17C 5/06; F17C 2221/031; F17C 2223/0123; F17C 2270/0581; F05D 2260/211; F05D 2260/213; F05D 2260/42
USPC .......................................................... 165/10
See application file for complete search history.

(56) References Cited

U.S. PATENT DOCUMENTS

| | | |
|---|---|---|
| 3,019,854 A | 2/1962 | Waitus |
| 3,643,426 A | 2/1972 | Janelid |
| 3,895,493 A | 7/1975 | Rigollot |
| 3,939,356 A | 2/1976 | Loane |
| 3,988,897 A | 11/1976 | Strub |
| 3,996,741 A | 12/1976 | Herberg |
| 4,085,971 A | 4/1978 | Jacoby |
| 4,147,204 A | 4/1979 | Pfenninger |
| 4,150,547 A | 4/1979 | Hobson |
| 4,343,569 A | 8/1982 | Schwarzenbach |
| 4,355,923 A | 10/1982 | Schwarzenbach |
| 4,391,552 A | 7/1983 | O'hara |
| 4,392,354 A | 7/1983 | Schwarzenbach |
| 4,399,656 A * | 8/1983 | Laing .................. F01K 3/00 376/322 |
| 4,403,477 A | 9/1983 | Schwarzenbach |
| 4,450,547 A | 5/1984 | Nakamura et al. |
| 4,454,721 A | 6/1984 | Hurlimann |
| 4,523,432 A * | 6/1985 | Frutschi .................. F02C 6/14 60/659 |
| 4,538,414 A | 9/1985 | Saleh |
| 4,727,930 A | 3/1988 | Bruckner |
| 5,634,340 A | 6/1997 | Grennan |
| 6,167,951 B1 | 1/2001 | Couch |
| 6,185,841 B1 | 2/2001 | Conochie |
| 6,467,535 B1 | 10/2002 | Shembekar |
| 6,637,977 B2 | 10/2003 | Hayashi |
| 6,739,522 B2 | 5/2004 | Laumen |
| 7,663,255 B2 | 2/2010 | Kim |
| 7,755,212 B2 | 7/2010 | Enis et al. |
| 8,136,354 B2 | 3/2012 | Havel |
| 8,277,145 B2 | 10/2012 | Dickinson, III et al. |
| 8,663,255 B2 | 3/2014 | Torain et al. |
| 8,739,522 B2 | 6/2014 | Anikhindi |
| 9,045,209 B2 | 6/2015 | Zeren et al. |
| 9,322,296 B2 | 4/2016 | Hugo et al. |
| 9,383,105 B2 | 7/2016 | Naeve |
| 9,404,512 B2 | 8/2016 | Ulrich |
| 9,422,948 B2 | 8/2016 | Kim et al. |
| 9,433,910 B2 | 9/2016 | Wyttenbach |
| 9,739,536 B2 | 8/2017 | Erben |
| 9,777,965 B2 | 10/2017 | Chordia |
| 9,803,603 B2 | 10/2017 | Ganser |
| 9,803,803 B1 | 10/2017 | Adams |
| 10,859,207 B2 | 12/2020 | Lewis |
| 11,274,792 B2 | 3/2022 | Stradiotto |
| 11,519,393 B2 | 12/2022 | Lewis |
| 11,591,957 B2 | 2/2023 | Howitt |
| 11,644,150 B2 | 5/2023 | Stradiotto |
| 11,767,950 B2 | 9/2023 | Lewis et al. |
| 11,821,584 B2 | 11/2023 | Stradiotto |
| 11,835,023 B2 | 12/2023 | Young |
| 2003/0021631 A1 | 1/2003 | Hayashi |
| 2005/0004416 A1 | 1/2005 | Okutsu |
| 2008/0000233 A1 | 1/2008 | Althaus |
| 2010/0218500 A1 | 9/2010 | Ruer |
| 2010/0248500 A1 | 9/2010 | Ting et al. |
| 2011/0094212 A1 | 4/2011 | Ast |
| 2011/0094229 A1 | 4/2011 | Freund |
| 2011/0094231 A1 | 4/2011 | Freund |
| 2011/0094242 A1 | 4/2011 | Koerner |
| 2011/0100010 A1 * | 5/2011 | Freund ...................... F02C 6/18 60/659 |
| 2011/0296823 A1 | 12/2011 | McBride |
| 2012/0057998 A1 | 3/2012 | Ingersoll |
| 2012/0067047 A1 | 3/2012 | Peterson |
| 2012/0102954 A1 | 5/2012 | Ingersoll |
| 2012/0174569 A1 | 7/2012 | Ingersoll |
| 2012/0297776 A1 | 11/2012 | Bollinger |
| 2013/0061591 A1 | 3/2013 | Bove |
| 2014/0013735 A1 | 1/2014 | Mcbride |
| 2014/0020369 A1 | 1/2014 | Guidati |
| 2015/0000248 A1 | 1/2015 | Del Omo |
| 2015/0015210 A1 | 1/2015 | Bradwell |
| 2015/0019096 A1 | 1/2015 | Kim |
| 2015/0091301 A1 | 4/2015 | Littmann |
| 2015/0114611 A1 | 4/2015 | Morris |
| 2015/0125210 A1 | 5/2015 | Ingersoll |
| 2015/0267612 A1 * | 9/2015 | Bannari .................. F02C 6/16 60/659 |
| 2016/0032783 A1 | 2/2016 | Howes |
| 2016/0231072 A1 | 8/2016 | Pohlman |
| 2017/0013867 A1 | 1/2017 | Kelleher et al. |
| 2017/0138674 A1 | 5/2017 | Pourima |
| 2017/0159503 A1 | 6/2017 | Plais |
| 2017/0350658 A1 * | 12/2017 | Kerth ................... H02K 7/1823 |
| 2018/0017213 A1 | 1/2018 | Deleau |
| 2018/0094581 A1 | 4/2018 | Teixeira |
| 2018/0179916 A1 | 6/2018 | Larochelle |
| 2018/0313270 A1 | 11/2018 | Jones |
| 2019/0011593 A1 | 1/2019 | Marsala |
| 2019/0346082 A1 | 11/2019 | Lewis |
| 2020/0103178 A1 | 4/2020 | Gerstler |
| 2021/0207586 A1 | 7/2021 | Lewis |
| 2021/0207771 A1 | 7/2021 | Lewis |
| 2021/0388809 A1 | 12/2021 | Young |
| 2021/0388810 A1 | 12/2021 | Young |
| 2022/0090585 A1 | 3/2022 | Lewis |
| 2022/0196341 A1 | 6/2022 | Young |
| 2023/0110494 A1 | 4/2023 | Cameron |
| 2023/0332843 A1 | 10/2023 | Lewis |
| 2024/0035621 A1 | 2/2024 | Stradiotto |
| 2024/0191725 A1 | 6/2024 | Young |
| 2024/0218885 A1 | 7/2024 | Young |

FOREIGN PATENT DOCUMENTS

| | | |
|---|---|---|
| CA | 1160063 A | 1/1984 |
| CA | 1179511 | 12/1984 |
| CA | 1281611 C | 3/1991 |
| CA | 2785004 A1 | 6/2011 |
| CA | 2807502 A1 | 2/2012 |
| CA | 2824798 A1 | 7/2012 |
| CA | 2982255 A1 | 10/2016 |
| CA | 3052080 A1 | 8/2018 |
| CA | 3055620 A1 | 9/2018 |
| CN | 103206349 A | 7/2013 |
| CN | 205422944 U | 8/2016 |
| CN | 107842392 A | 3/2018 |
| CN | 207847852 U | 9/2018 |
| DE | 2636417 A1 | 2/1978 |
| DE | 102010055750 A1 * | 6/2012 ............... F02C 6/16 |
| EP | 0566868 A | 2/1996 |
| EP | 1443177 A1 | 8/2004 |
| EP | 2450549 A2 | 5/2012 |
| EP | 2530283 A1 | 12/2012 |
| EP | 2549090 | 1/2013 |
| EP | 2549090 A1 | 1/2013 |

(56) References Cited

FOREIGN PATENT DOCUMENTS

| | | |
|---|---|---|
| EP | 2559881 A2 | 2/2013 |
| EP | 2530283 B1 | 9/2013 |
| EP | 2832666 A1 | 4/2015 |
| EP | 2447501 A2 | 5/2021 |
| FR | 2706432 A1 | 12/1994 |
| FR | 3023321 | 1/2016 |
| FR | 3023321 A1 | 1/2016 |
| FR | 3019854 A1 | 10/2016 |
| GB | 1213112 A | 11/1970 |
| GB | 2013318 A | 8/1979 |
| GB | 2528449 A | 1/2016 |
| JP | S54133211 A | 10/1979 |
| JP | 55-115498 | 8/1980 |
| JP | S5797997 A | 6/1982 |
| JP | H0275730 A | 3/1990 |
| JP | H04121424 A | 4/1992 |
| JP | H05214888 A | 8/1993 |
| JP | H07330079 A | 12/1995 |
| JP | H09154244 A | 6/1997 |
| JP | 2636417 B2 | 7/1997 |
| JP | H09287156 A | 11/1997 |
| JP | H1121926 | 1/1999 |
| JP | 2005009609 A | 1/2005 |
| JP | 2013509528 A | 3/2013 |
| JP | 2016211515 A | 12/2016 |
| WO | 1998039613 | 9/1998 |
| WO | 2011053411 A1 | 5/2011 |
| WO | 2012097216 | 7/2012 |
| WO | 2013131202 A1 | 9/2013 |
| WO | 2014183894 | 11/2014 |
| WO | 2015015184 A2 | 2/2015 |
| WO | 2015019096 A1 | 2/2015 |
| WO | 2015159278 | 10/2015 |
| WO | 2016012764 A1 | 1/2016 |
| WO | 2016131502 A1 | 8/2016 |
| WO | 2016185906 A1 | 11/2016 |
| WO | 2017093768 A1 | 6/2017 |
| WO | 2017140481 A1 | 8/2017 |
| WO | 2017194253 A1 | 11/2017 |
| WO | 2017198397 A1 | 11/2017 |
| WO | WO-2018141057 A1 * | 8/2018 ............... B65G 5/00 |
| WO | 2018161172 | 9/2018 |
| WO | 2018161172 A1 | 9/2018 |
| WO | 2019011593 A1 | 1/2019 |
| WO | 2019218084 | 11/2019 |
| WO | 2019218085 | 11/2019 |
| WO | 2020146938 | 7/2020 |
| WO | 2020160635 | 8/2020 |
| WO | 2020160670 | 8/2020 |
| WO | 2020160681 | 8/2020 |
| WO | 2020172748 | 9/2020 |
| WO | 2022213179 | 10/2022 |
| WO | 2022226656 | 11/2022 |
| WO | 2024130447 | 6/2024 |

OTHER PUBLICATIONS

Search Report dated Sep. 29, 2022 for European Application No. 20753221.9-1004, 8 pgs.
Search Report dated Sep. 11, 2022 for European Application No. 19914559.0-1004, 8 pgs.
Sequi, P.M., "Modelling of the Dynamic Behavior of an Advanced Adiabatic Compressed Air Energy Storage (AA-CAES", Escuela Tecnica Superior de Ingenieros Industriales-UPM, (20181100), pp. 41-117, URL: http://oa.upm.es/53802/1/TFG_PABLO_MARTIN_SEQUI.pdf, (Mar. 25, 2020), XP055731474.
"ADELE—Adiabatic Compressed-Air Energy Storage for Electricity Supply", (20100100), URL: https://www.rwe.com/web/cms/mediablob/en/391748/data/364260/1/rwe-power-ag/innovations/Brochure-ADELE.pdf, (Mar. 26, 2020), XP055323121.
Office Action (Non-final) issued for U.S. Appl. No. 17/429,155, mailed Dec. 12, 2023.
International Search Report for PCT/CA2020/050169, mailed Apr. 15, 2020.
"Shell and Tube Heat Exchangers" article available online from Thermopedia as of Feb. 8, 2011, available at https://www.thermopedia.com/content/1121/.
"Coil-Wound Heat Exchangers (CWHEs)" publication from Linde Engineering, copyright 2018-2019, available online at https://assets.linde.com/-/media/global/engineering/engineering/home/products-and-services/plant-components/plate-fin-heat-exchangers/coil-wound-heat-exchanger-2019.pdf.
Office Action dated May 3, 2024 for Australian Application 2019268820.
Supplemental Search Report issued for European Application No. 19803698.0, mailed Feb. 8, 2022.
Examination Report issued for European Application No. 19803698.0, mailed Apr. 26, 2024.
European Search Report received for European Application No. 18747216.2 on Apr. 7, 2021, 16 pgs.
Office Action (Notice of Allowance and Fees Due (PTOL-85)) dated Apr. 9, 2024 for U.S. Appl. No. 17/055,949 (pp. 1-8).
Office Action (Notice of Allowance and Fees Due (PTOL-85)) dated May 14, 2024 for U.S. Appl. No. 17/055,948 (pp. 1-10).
Office Action (Notice of Allowance and Fees Due (PTOL-85)) dated May 16, 2024 for U.S. Appl. No. 17/055,948 (pp. 1-2).
International Search Report and Written Opiniont Received for PCT/CA2019/050680, mailed Jul. 8, 2019.
Laubscher, Hendrik et al. "Developing a cost effective rock bed thermal energy storage system: Design and modelling", article published Jun. 27, 2017.
Jorio, Luigi, "A huge battery made of air" online article published Aug. 10, 2016, available at https://www.swissinfo.ch/eng/sci-tech/energy-in-the-mountains_a-huge-battery-made-of-air/42362400.
European Search Report issued for European Application No. 20740789.1, mailed Sep. 27, 2022.
International Search Report and Written Opinion received for PCT Serial No. PCT/CA2020/050032 dated Mar. 27, 2020, 10 pgs.
Office Action (Final Rejection) dated Feb. 16, 2024 for U.S. Appl. No. 17/974,363 (pp. 1-6).
Office Action (Notice of Allowance and Fees Due (PTOL-85)) dated Jun. 24, 2024 for U.S. Appl. No. 17/974,363 (pp. 1-8).
International Search Report and Written Opinion received for PCT/CA2020/050153 on Apr. 24, 2020, 11 pgs.
Office Action (Final Rejection) dated Apr. 5, 2024 for U.S. Appl. No. 17/422,616 (pp. 1-9).
International Search Report and Written Opinion received for PCT Serial No. PCT/CA2020/050246 dated May 27, 2020, 10 pgs.
International Search Report for PCT/CA2022/050656, mailed Jul. 21, 2022.
International Preliminary Report on Patentability for PCT/CA2022/050656, mailed Oct. 24, 2023.
International Preliminary Report on Patentability issued on PCT/CA2022/050503 on Oct. 10, 2023.
International Search Report and Written Opinion for PCT/CA2023/051761 mailed Feb. 19, 2024.
International Preliminary Report on Patentability issued on PCT/CA2018/050112 mailed May 21, 2019 (26 pages).
International Preliminary Report on Patentability issued on PCT/CA2018/050282 mailed Sep. 10, 2019.
International Preliminary Report on Patentability issued on PCT/CA2019/050679 mailed Jul. 10, 2019.
International Preliminary Report on Patentability issued on PCT/CA2019/050680 mailed on Nov. 17, 2020.
Wang, J. et al., Overview of Compressed Air Energy Storage and Technology Development; Energies; 2017; 10, 991; 22 pages; http://wrap.warwick.ac.uk/91858/7/WRAP-overview-compressed-air-energy-storage-technology-Jevelopment-Wang-2017.pdf.
RWE Power AG: Essen/Koln, "ADELE—Adiabatic Compressed-Air Energy Storage for Electricity Supply", Feb. 3, 2011; http://www.rwe.com/web/cms/mediablob/en/391748/data/235554/1/rwe-power-ag/press/company/Brochure-ADELE.pdf.
Sequi, P.M. "Modelling of the Dynamic Behavior of an Advanced Adiabatic Compressed Air Energy Storage (AA-CAES)", Nov. 2018; 154 pages with Translation; http://oa.upm.es/53802/1/TFG_PABLO_MARTIN_SEQUI.pdf.
Office Action (Non-Final Rejection) dated Apr. 15, 2024 for U.S. Appl. No. 18/237,021 (pp. 1-11).

(56) References Cited

OTHER PUBLICATIONS

Office Action (Non-Final Rejection) dated Jun. 20, 2024 for U.S. Appl. No. 18/377,933 (pp. 1-9).
European Search Report issued for European Appliaction No. 19914559.0, mailed Nov. 9, 2022.
European Search Reported issued for European Appliation No. 20753221.9, mailed Sep. 29, 2022.
International Search Report and Written Opinion received for PCT Serial No. PCT/CA2019/050700 on Sep. 27, 2019, 9 pgs.
Office Action (Final Rejection) dated Jan. 25, 2024 for U.S. Appl. No. 17/429,146 (pp. 1-18).
International Preliminary Report on Patentability for PCT/CA2022/050656, mailed Oct. 23, 2023.

* cited by examiner

THREE SECTION CONFIGURATION FOR COMPRESSED AIR ENERGY STORAGE SYSTEMS

CROSS-REFERENCE TO RELATED APPLICATION

This application claims priority to U.S. Provisional Patent Application Ser. No. 62/802,746, filed Feb. 8, 2019 and entitled A COMPRESSED GAS ENERGY STORAGE SYSTEM, and to International Patent Application No. PCT/CA2019/050700 filed May 22, 2019 and entitled A COMPRESSED GAS ENERGY STORAGE SYSTEM, the entirety of these applications being incorporated by reference herein.

FIELD

The present disclosure relates generally to compressed gas energy storage, and more particularly to a compressed gas energy storage system such as, for example, one including a hydrostatically compensated, compressed air energy storage accumulator located underground, the use thereof.

INTRODUCTION

Electricity storage is highly sought after, in view of the cost disparities incurred when consuming electrical energy from a power grid during peak usage periods, as compared to low usage periods. The addition of renewable energy sources, being inherently of a discontinuous or intermittent supply nature, increases the demand for affordable electrical energy storage worldwide.

Thus there exists a need for effectively storing the electrical energy produced at a power grid or a renewable source during a non-peak period and providing it to the grid upon demand. Additionally, to the extent that the infrastructural preparation costs and the environmental impact from implementing such infrastructure are minimized, the utility and desirability of a given solution is enhanced.

Furthermore, as grids transform and operators look to storage in addition to renewables to provide power and remove traditional forms of generation that also provide grid stability, such as voltage support, a storage method that offers inertia based synchronous storage is highly desirable.

U.S. Pat. No. 3,996,741 discloses a system and apparatus for the storage of energy generated by natural elements. Energy from natural elements such as from the sun, wind, tide, waves, and the like, is converted into potential energy in the form of air under pressure which is stored in a large, subterranean cell. Machines of known types such as windmills are driven by natural elements to operate air compressors. Air compressors pump the air under pressure to the storage cell. Air entering the storage cell displaces water from the cell which returns to a water reservoir as an ocean or a lake. Water locks the air in the storage cell. The stored compressed air is available upon demand to perform a work function as driving an air turbine to operate an electric generator.

International patent publication no. WO2013/131202 discloses a compressed air energy storage system comprising a pressure accumulator for gas to be stored under pressure, and a heat accumulator for storing the compression heat that has accumulated during charging of the pressure accumulator, wherein the heat accumulator is arranged ready for use in an overpressure zone. Said arrangement enables a structurally simple heat accumulator to be provided, since said heat accumulator is not loaded by the pressure of the gas passing therethrough.

US patent publication no. US2013/0061591 discloses, during an adiabatic compressed air energy storage (ACAES) system's operation, energy imbalances may arise between thermal energy storage (TES) in the system and the thermal energy required to raise the temperature of a given volume of compressed air to a desired turbine entry temperature after the air is discharged from compressed air storage of the ACAES system. To redress this energy imbalance it is proposed to selectively supply additional thermal energy to the given volume of compressed air after it received thermal energy from the TES and before it expands through the turbine. The additional thermal energy is supplied from an external source, i.e. fuel burnt in a combustor. The amount of thermal energy added to the given volume of compressed air after it received thermal energy from the TES is much smaller than the amount of useful work obtained from the given volume of compressed air by the turbine.

SUMMARY OF THE INVENTION

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

The teachings of the present application are generally directed to a method of temporarily storing thermal energy via a thermal energy storage system in a compressed air energy storage system, and specifically a method that involves three thermal offtake points (e.g. three operations in which thermal energy is extracted from the compressed air using suitable heat exchangers and the like) when the system is in the charging mode, and optionally, a corresponding three thermal energy exchanges when the system is in the discharging mode (e.g. three steps in which stored thermal energy is re-introduced into the gas as it is being removed from the underground storage system and expanded). It has been discovered that in some embodiments of a compressed air energy storage system, for example those in which the accumulator is relatively deep underground (such as greater than about 200 m, 250, 300 m, 350 m, 400 m, 450 m or more below ground), using the teachings described herein may be beneficial because they may help facilitate higher pressure air storage with relatively manageable/desirable thermal storage temperatures (~200° C.). This may help facilitate relatively deeper air storage caverns to be constructed which can store energy at a greater 'density' than a shallower cavern (i.e. smaller caverns can be constructed). that the overall system efficiency may be somewhat improved if the system is configured to include three heat exchange steps during at least one of the chagrining and discharging modes (and preferably during both), as compared to a similarly configured system that utilized fewer than 3 or more than 3 heat exchange steps.

There are several possibilities for the thermal storage media, including liquids or solids, such as granular particles like sand or gravel. Similarly, there are many possible configurations for the heat exchange of thermal energy with the compressed gas, including both direct and indirect heat exchanger. The choice of heat exchanger may be influenced by the choice of thermal storage media.

Water may be a preferable choice of thermal storage media. Water has relatively fewer environmental concerns than some other possible thermal storage fluids, has relatively few or limited adverse effects on human health, is relatively plentiful and inexpensive and can be used at suitable operating temperatures for the systems described herein. If water is pressurized above its vapour pressure for a given temperature, then the water will stay in its liquid state even if it would have boiled were it being maintained at a lower pressure. Pressuring water to above atmospheric pressures may help keep it in its liquid state at temperatures higher than 100 deg. C., which may help facilitate the storage of more thermal energy within the water than would be possible at atmospheric pressure. In other embodiments, the thermal storage liquid may be mineral oil, synthetic oil, combinations of oil and water and any other suitable fluids.

In accordance with one broad aspect of the teachings described herein, A method of temporarily storing thermal energy via a thermal storage subsystem in a compressed air energy storage system comprising an accumulator disposed at least 300 m underground and having an interior configured to contain compressed air at an accumulator pressure that is at least 20 bar and a gas compressor/expander subsystem in communication with the accumulator via an air flow path for conveying compressed air to the accumulator when in a charging mode and from the accumulator when in a discharging mode, the method may include, when in the charging mode, the steps of:

a) introducing air into an inlet of the air flow path and compressing the air to a first pressure using a first compressor in the air flow path,
 b) transferring a first amount of thermal energy from the air to a first flow of thermal storage liquid via a first heat exchanger whereby the thermal storage liquid is heated to a first liquid temperature when exiting the first heat exchanger;
 c) compressing the air to a second pressure and a second temperature using a second compressor downstream from the first compressor in the air flow path;
 d) transferring a second amount of thermal energy from the air to a second flow of thermal storage liquid via a second heat exchanger whereby the second flow of thermal storage liquid is heated to a second liquid temperature when exiting the second heat exchanger;
 e) compressing the air to substantially the accumulator pressure and a third temperature using a third compressor downstream from the second compressor in the air flow path;
 f) transferring a third amount of thermal energy from the air to a third flow of thermal storage liquid via a third heat exchanger whereby the third flow of thermal storage liquid is heated to a third liquid temperature when exiting the third heat exchanger;
 g) storing the first flow of thermal storage liquid, the second flow of thermal storage liquid and the third flow of thermal storage liquid in a thermal storage reservoir at a storage temperature that is substantially equal to or less than a highest of the first, second and third liquid temperatures and at a storage pressure that is greater than a boiling pressure of the thermal storage liquid at the storage temperature; and
 h) conveying air exiting the third heat exchanger into the accumulator.

The method may also include, when in the discharging mode, the steps of:
 a) withdrawing air from the accumulator at substantially the accumulator pressure;
 b) reintroducing thermal energy from a first portion of the stored thermal storage liquid into the air thereby raising the air temperature
 c) expanding the heated air to a third pressure to drive a first expander;
 d) reintroducing thermal energy from a second portion of the stored thermal storage liquid into the air exiting the first expander thereby raising the air temperature
 e) expanding the heated air to a fourth pressure to drive a second expander,
 f) reintroducing thermal energy from a third portion of the stored thermal storage liquid into the air exiting the second expander thereby raising the air temperature; and
 g) expanding the heated air to a fifth pressure to drive a third expander.

Step 2(b) may be performed using the third heat exchanger, step 2(d) may be performed using the second heat exchanger and step 2(f) may be performed using the first heat exchanger.

The first pressure may be substantially equal to the fourth pressure and the second pressure may be substantially equal to the third pressure Approximately 75% or more of the thermal energy that is transferred form the gas into the thermal storage liquid in the charging mode may be reintroduced into the gas from the thermal storage liquid in the discharging mode.

The method may also include the step of pressurizing the thermal storage reservoir to the storage pressure using the thermal storage fluid in its gaseous state.

The accumulator pressure may be between about 30 bar and about 80 bar.

The storage pressure may be between about 10 bar and about 20 bar.

The storage temperature may be between about between about 150 and about 300 degrees Celsius.

The accumulator may include a hydrostatically compensated accumulator containing a layer of compensation liquid beneath a layer of the compressed air and the method may also include the steps of:
 a) when in the charging mode, conveying compressed gas into the accumulator and displacing a corresponding volume of compensation liquid from the layer of compensation liquid out of the accumulator toward a compensation liquid reservoir via a compensation liquid flow path thereby maintaining the layer of compressed air at substantially the accumulator pressure during the charging mode; and
 b) when in the discharging mode, conveying compressed gas from the accumulator by providing a corresponding volume of compensation liquid into the accumulator as the compressed air is removed thereby maintaining the layer of compressed air at substantially the accumulator pressure during the discharging mode.

The thermal storage reservoir may include a storage vessel, such as a pressure bearing tank, and the storage pressure may be less than a rated pressure of the storage vessel.

The thermal storage reservoir may include an underground cavern generally surrounded by rock having a lithostatic gradient, and the storage pressure may be less than the lithostatic gradient.

In accordance with another broad aspect of the teachings described herein, a compressed air energy storage system operable in at least a charging mode and a discharging mode may include:

a) an accumulator comprising a chamber disposed at least 300 m underground and having an accumulator interior configured to contain compressed air at a accumulator pressure when in use;
b) a three-stage gas compressor/expander subsystem in fluid communication with the accumulator interior via an air flow path and configured to convey a flow of compressed air into the accumulator when in the charging mode and out of the accumulator when in the discharging mode; the three-stage gas compressor/expander subsystem comprising:
  i. a first compressor in the air flow path, a second compressor downstream from the first compressor and a third compressor downstream from the second compressor wherein compressed gas exiting the third compressor is substantially equal to the accumulator pressure and flows into the accumulator for storage in the charging mode;
c) a three-stage thermal storage subsystem having a liquid flow path configured to circulate a thermal storage liquid between a source reservoir and a thermal storage reservoir, the three-stage thermal storage subsystem comprising:
  i. a first heat exchanger in the liquid flow path and in the air flow path between the first compressor and second compressor to transfer a first amount of thermal energy from the air to a first flow of thermal storage liquid;
  ii. a second heat exchanger in the liquid flow path and in the air flow path between the second compressor and third compressor to transfer a second amount of thermal energy from the air to a second flow of thermal storage liquid; and
  iii. a third heat exchanger in the liquid flow path and in the air flow path between the third compressor and the accumulator to transfer a third amount of thermal energy from the air to a third flow of thermal storage liquid.

When in the charging mode the first flow, second flow and third flow of thermal storage liquid may be conveyed towards and retained within the thermal storage reservoir at a storage pressure and at a storage temperature. The storage pressure may be greater than atmospheric pressure and the storage temperature may be greater than a boiling temperature of the thermal storage liquid when at atmospheric pressure and may be less than a boiling temperature of the thermal storage liquid when at the storage pressure.

The thermal storage liquid exiting the first heat exchanger, the thermal storage liquid exiting the second heat exchanger and the thermal storage liquid exiting the third heat exchanger may be at substantially the storage temperature.

A first exit temperature of the gas exiting the first compressor may be between about 150 and about 300 degrees Celsius, a second exit temperature of the gas exiting the second compressor may be between about 150 and about 300 degrees Celsius and a third exit temperature of the gas exiting the third compressor may be between about 150 and about 300 degrees Celsius.

The first exit temperature, second exit temperature and third exit temperature may be within about 25 degrees Celsius of each other.

The first exit temperature, second exit temperature and third exit temperature may be each within about 25 degrees Celsius of the storage temperature.

The storage temperature may be between about between about 150 and about 300 degrees Celsius and the accumulator pressure may be between about 30 bar and about 80 bar.

When in the charging mode:
a) a first amount of thermal energy may be transferred from the gas to the thermal storage liquid via the first heat exchanger;
b) a second amount of thermal energy may be transferred from the gas to the thermal storage liquid via the second heat exchanger; and
c) a third amount of thermal energy may be transferred from the gas to the thermal storage liquid via the third heat exchanger, and wherein the first amount, second amount and third amount may be all within about 30% of each other.

The first, second and third amounts of thermal storage energy transferred from the gas to the thermal storage liquid may be approximately the same as each other.

A first exit temperature of the thermal storage liquid exiting the first heat exchanger, a second exit temperature of the thermal storage liquid exiting the second compressor and a third exit temperature of the thermal storage liquid exiting the third heat exchanger may each be between 100% and 110% of the storage temperature.

The thermal storage liquid may include at least one of water, mineral oil, synthetic oil and a combination thereof.

The three-stage gas compressor/expander subsystem may also include at least a first expander in the airflow path and configured to be driven by gas exiting the accumulator and to drive at least a first generator to generate electricity when in the discharging mode.

The accumulator may include an underground hydrostatically compensated accumulator configured to contain a layer of compensation liquid beneath a layer of the compressed gas at the accumulator pressure.

A compensation liquid reservoir may be spaced apart from the accumulator and in fluid communication with the layer of compensation liquid within the accumulator via a compensation liquid flow path compensation whereby liquid can flow between the accumulator and the compensation liquid reservoir when in use, wherein
a) during the charging mode the compressed air enters the accumulator at the accumulator pressure which displaces a corresponding volume of compensation liquid from the layer of compensation liquid out of the accumulator via the compensation liquid flow path thereby maintaining the layer of compressed air at substantially the accumulator pressure during the charging mode; and
b) during the discharging mode the compensation liquid re-enters the accumulator via the compensation liquid flow path as air is removed from the accumulator thereby maintaining the layer of compressed air at substantially the accumulator pressure during the discharging mode.

The system may be operable in a storage mode in which there is no flow of the compensation liquid into or out of the accumulator and the layer of compressed gas is retained in the accumulator at least substantially the accumulator pressure.

The thermal storage reservoir may include a storage vessel and the storage pressure may be less than a rated pressure of the storage vessel.

The thermal storage reservoir may include an underground storage cavern disposed within surrounding rock at a reservoir depth. The accumulator pressure may be configured so that it is less than a lithostatic gradient of the surrounding rock.

The storage reservoir may be pressurized to the storage pressure by boiling or evaporating of the thermal fluid within the storage reservoir.

BRIEF DESCRIPTION OF THE DRAWINGS

The drawings included herewith are for illustrating various examples of articles, methods, and apparatuses of the teaching of the present specification and are not intended to limit the scope of what is taught in any way.

DETAILED DESCRIPTION

Figure 1:
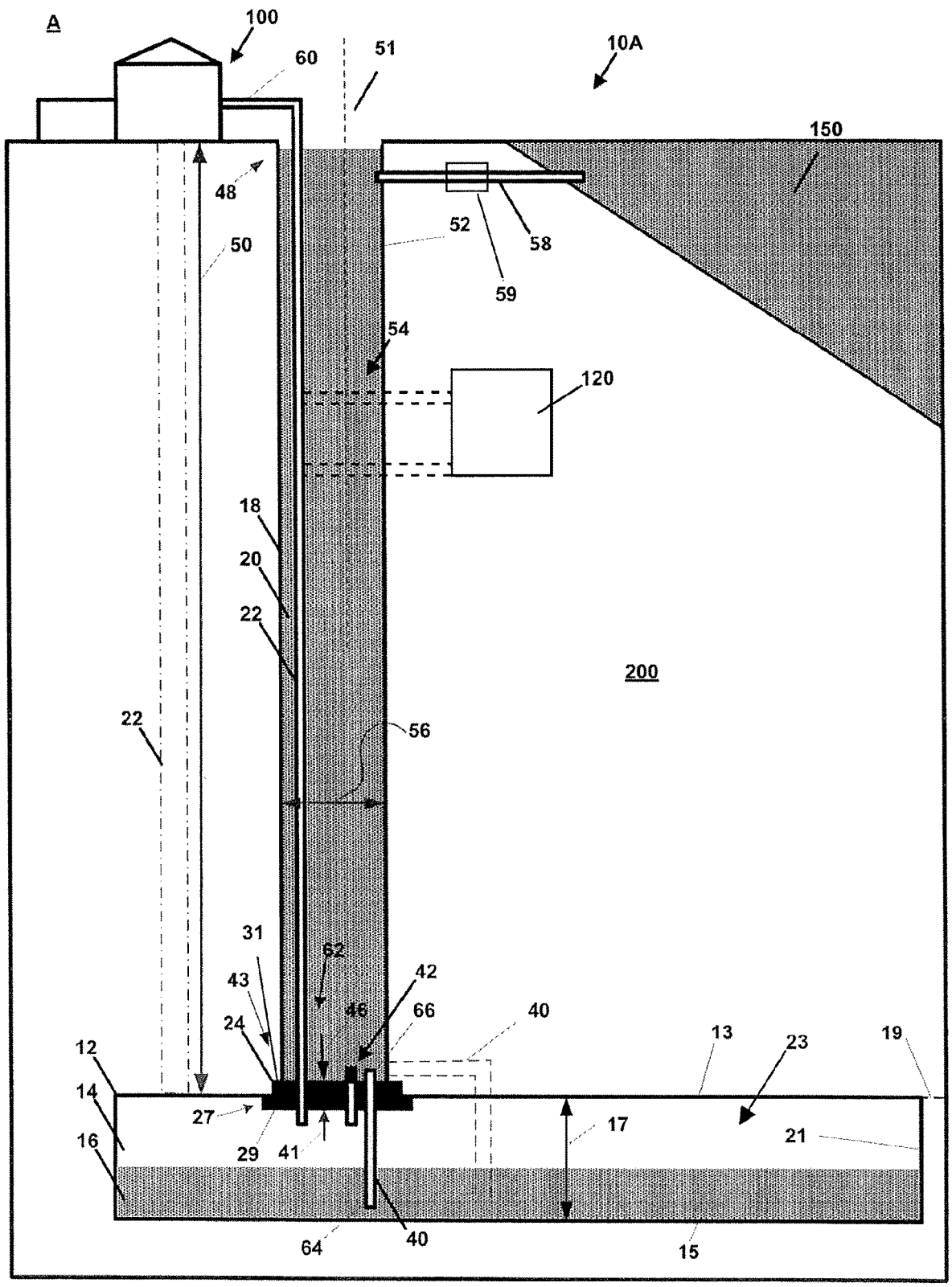
FIG. 1 is a schematic representation of one example of a hydrostatically compressed gas energy storage system.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Energy produced by some types of energy sources, such as windmills, solar panels and the like may tend to be produced during certain periods (for example when it is windy, or sunny respectively), and not produced during other periods (if it is not windy, or at night, etc.). However, the demand for energy may not always match the production periods, and it may be useful to store the energy for use at a later time. Similarly, it may be helpful to store energy generated using conventional power generators (coal, gas and/or nuclear power plants for example) to help facilitate storage of energy generated during non-peak periods (e.g. periods when electricity supply could be greater than demand and/or when the cost of electricity is relatively high) and allow that energy to be utilized during peak periods (e.g. when the demand for electricity may be equal to or greater than the supply, and/or when the cost of electricity is relatively high).

As described herein, compressing and storing a gas (such as air), using a suitable compressed gas energy storage system, is one way of storing energy for later use. For example, during non-peak times, energy (i.e. electricity) can be used to drive compressors and compress a volume of gas to a desired, relatively high pressure for storage. The gas can then be stored at the relatively high pressure inside any suitable container or vessel, such as a suitable accumulator. To extract the stored energy, the pressurized gas can be released from the accumulator and used to drive any suitable expander apparatus or the like, and ultimately to be used to drive a generator or the like to produce electricity. The amount of energy that can be stored in a given compressed gas energy storage system may be related to the pressure at which the gas is compressed/stored, with higher pressure storage generally facilitating a higher energy storage. However, containing gases at relatively high pressures in conventional systems, such as between about 45-150 atm, can require relatively strong, specialized and often relatively costly storage containers/pressure vessels.

When gas is compressed for storage (for example during a charging mode) its temperature tends to increase, and if the gas passes through multiple compression stages its temperature can increase with each stage. Further, some compressors may have a preferred inlet temperature range in which they operate with a desired level of efficiency. Gas that has been compressed in a one compression stage may, in some systems, be heated to a temperature that is above a desired inlet temperature for a subsequent compression stage. Reducing the temperature of the gas exiting an upstream compression stage before it reaches a subsequent compression stage may be advantageous.

Similarly, when compressed gas is removed from an accumulator and expanded for electricity generation (for example when in a discharge mode), the expansion process is endothermic and thermal energy is transferred into the expanding gas resulting in a temperature reduction.

Optionally, the thermal heat that is removed/extracted from the gas exiting one or more compression stages when the system is in a charging mode of the system can be stored in a suitable thermal storage subsystem, and preferably at least some of that heat/thermal energy can then be re-introduced into the gas that is removed from the accumulator and is passing through suitable expansion stages during the discharge mode. This may help improve the overall efficiency of a compressed gas energy storage system. This may also help reduce and/or eliminate the need for heat sinks/sources or other apparatuses to dissipate heat when in the charging mode and/or supply new heat when in the discharging mode.

Thermal energy/heat that is extracted from the compressed gas can be stored in any suitable thermal storage apparatus, including those described herein. In systems where the pressure within the accumulator while the system is in use is substantially higher than atmospheric pressure (e.g. such as between about 10 and 80 bar, and may be between about 30 and 70 bar, and optionally between about 40 and 60 bar) it may be preferable to compress the air in stages, using one or more suitable compressors, rather than attempting to achieve the full pressure change in a single compression step. For example, as explained herein, the air being drawn into the system may be subjected to three compression stages (each compression stage may include a single compressor or multiple compressors), in series, each of which provides a portion of the overall pressure increase for the system. Each time the air is compressed it may become warmer and it may then therefore be desirable to extract thermal energy/heat from the gas as it exits each of the three compression stages, preferably using three corresponding heat exchange/thermal transfer stages (each thermal transfer stage may include a single heat exchanger or multiple heat exchangers).

Preferably, the system can be configured so that each compression stage is configured to have a generally equal compression ratio (the ratio of compressor outlet pressure to compressor inlet pressure). For example, if a given embodiment of a compressed air energy storage is configured to have an accumulator storage pressure of about 64 bar, each of the three compression stages may be configured to have a pressure ratio of about 4, resulting in a pressure of about 4 bar at the outlet of the first compression stage and a pressure of about 16 bar at the outlet of the second compression stage. In this arrangement, the amount of thermal energy generated in each compression stage may also be generally the same, as the temperature increase of the gas during a compression stage is proportional to the magnitude of the relative pressure change in the compression stage and does not depend on the absolute pressure of the gas. This may be useful because the if the gas enters each of the compression stages having a similar inlet temperature then the gas exiting each of the compression stages may also have substantially similar exit temperatures, which may help facilitate the design and operation, as well as improve efficiency, of the heat exchangers and other aspects of the thermal storage subsystem. If the gas has substantially the same temperature leaving each compression stage then the three thermal transfer stages may be configured to operate with substantially the same gas temperatures and therefore about the same thermal storage media/liquid temperatures as the inlets and outlets of the thermal transfer stages. This may allow the thermal storage media that is used, e.g. the water in the examples described herein, to be at least partially handled using a common liquid handling system/flow path, and it may allow each of the three thermal transfer stages to draw thermal storage liquid from a common reservoir (at a common inlet temperature) and for the heated thermal storage liquid to be stored in a common storage reservoir and/or under substantially the same storage conditions (temperatures, pressures, etc.). This may help facilitate the use of common thermal storage system components to process the gas leaving multiple different compression stages.

Operating three compression stages may also allow the system to be configured so that the amount of thermal energy that is to be extracted and stored following a given compression stage can be stored using water as the thermal storage liquid without boiling the water. That is, the system can be configured such that the operating pressure of the water circulated within the thermal storage subsystem is selected so that the temperature of the water exiting a given thermal transfer stage is less than the boiling temperature of the water at the operating pressure of the thermal storage subsystem. More preferably, the system can be configured so that the boiling pressure of the water when at the storage temperature (temperature exiting a given thermal storage stage) is less than 250 psi, which may help facilitate the use of common pressure vessels for the storage of the heated thermal fluid.

If two or fewer compression stages are utilized to reach an accumulator storage pressure like those described herein then the amount of thermal storage energy that is to be absorbed after each compression stage may be such that it raises the temperature of the thermal storage water to a temperature such that its boiling pressure far exceeds the pressure rating of standard pressure vessels (e.g. >250 psi). Such a circumstances may lead to a need for specialized pressure vessels, piping, heat exchangers, pumps, and the like which may be prohibitively costly when designed to operating pressures far exceeding 250 psi.

Furthermore, if two or fewer compression stages are utilized to reach an accumulator storage pressure like those described herein the outlet temperatures of each compression stage may exceed standard design temperatures. If compressor outlet temperatures are in excess of the temperatures used in standard compressor applications then advanced engineering, design and material selection may be required resulting in increased cost and a lower design confidence.

Referring to FIG. 1 one example of a hydrostatically compensated compressed gas energy storage system 10A, that can be used to compress, store and release a gas, includes an accumulator 12 that is located underground (although in another embodiment the accumulator may be located above ground). In this example, the accumulator 12 serves as a chamber for holding both compressed gas and a liquid (such as water) and can include any suitable type of pressure vessel or tank, or as in this example can be an underground cave or chamber that is within ground 200. In this embodiment, accumulator 12 is lined, for example using concrete, metal, plastic and combinations thereof or the like, to help make it substantially gas and/or liquid impermeable so as to help to prevent unwanted egress of gas or liquid from within the interior 23. In another embodiment, the accumulator is preferably impermeable to gas and or liquid without requiring a lining.

The accumulator 12 may have any suitable configuration, and in this example, includes an upper wall 13 and an opposing lower wall 15 that are separated from each other by an accumulator height 17. The upper and lower walls 13 and 15 may be of any suitable configuration, including curved, arcuate, angled, and the like, and in the illustrated example are shown as generally planar surfaces, that are generally parallel to a horizontal reference plane 19. The accumulator 12 also has an accumulator width (not shown—measured into the page as illustrated in FIG. 1). The upper and lower walls 13 and 15, along with one or more sidewalls 21 at least partially define an interior 23 of the accumulator 12, that has an accumulator volume.

The accumulator 12 in a given embodiment of the system 10A can be sized based on a variety of factors (e.g. the quantity of gas to be stored, the available space in a given location, etc.) and may, in some examples may be between about 1,000 m$^3$ and about 2,000,000 m$^3$ or more. For example, in this embodiment the accumulator 12 contains a layer of stored compressed gas 14 atop a layer of liquid 16, and its volume (and thus capacity) can be selected based on the quantity of gas 14 to be stored, the duration of storage required for system 10A, and other suitable factors which may be related to the capacity or other features of a suitable power source and/or power load (see power source/load S/L in FIG. 2) with which the system 10A is to be associated. The power source/load S/L may be, in some examples, a power grid, a power source (including renewable and optionally non-renewable sources) and the like. Furthermore, the power source and power load may be completely independent of each other (e.g. the power source 25 may be a renewable source, and the power load may be the grid).

Preferably, the accumulator 12 may be positioned below ground or underwater, but alternatively may be at least partially above ground. Positioning the accumulator 12 within the ground 200, as shown, may allow the weight of the ground/soil to help backstop/buttress the walls 13, 15 and 21 of the accumulator 12, and help resist any outwardly acting forces that are exerted on the walls 13, 15 and 21 of the interior 23 of the accumulator. Its depth in the ground is established according to the pressures at which the compression/expansion equipment to be used is most efficiently operated, the geology in the surrounding area and the like.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment and gas/air that is released from within the accumulator 12 can similarly be vented to the ambient environment, optionally without requiring further treatment. In this embodiment, the compressed gas 14 is compressed atmospheric air, and the liquid is water.

Optionally, to help provide access to the interior of the accumulator 12, for example for use during construction of the accumulator and/or to permit access for inspection and/or maintenance, the accumulator 12 may include at least one opening that can be sealed in a generally air/gas tight manner when the system 10A is in use. In this example, the accumulator 12 includes a primary opening 27 that is provided in the upper wall 13. The primary opening 27 may be any suitable size and may have a cross-sectional area (taken in the plane 19) that is adequate based on the specific requirements of a given embodiment of the system 10A. In one embodiment the cross-sectional area is between about 0.75 m2 and about 80 m2 but may be larger or smaller in a given embodiment.

When the system 10A is in use, the primary opening 27 may be sealed using any suitable type of partition that can function as a suitable sealing member. In the embodiment of FIG. 1, the system 10A includes a partition in the form of a bulkhead 24 that covers the primary opening 27. Some examples of suitable partitions are described in PCT/CA2018/050112 and PCT/CA2018/050282.

When the bulkhead 24 is in place, as shown in FIG. 1, it can be secured to, and preferably sealed with the accumulator wall, in this embodiment upper wall 13, using any suitable mechanism to help seal and enclose the interior 23. In this embodiment the shaft 18 is illustrated schematically as a generally linear, vertical column. Alternatively, the shaft 18 may be a generally linear inclined shaft or preferably may be a curved and/or generally spiral/helical type configuration and which may be referred to as a shaft or generally as a decline. Some embodiments may include a generally spiralling configured decline that winds from an upper end to a lower end and can have an analogous function and attributes as the vertical shaft 18 of FIG. 1 despite having a different geometrical configuration. Discussions of the shaft/decline 18 and its purposes in one embodiment can be applied to other embodiments described herein.

Figure 3:
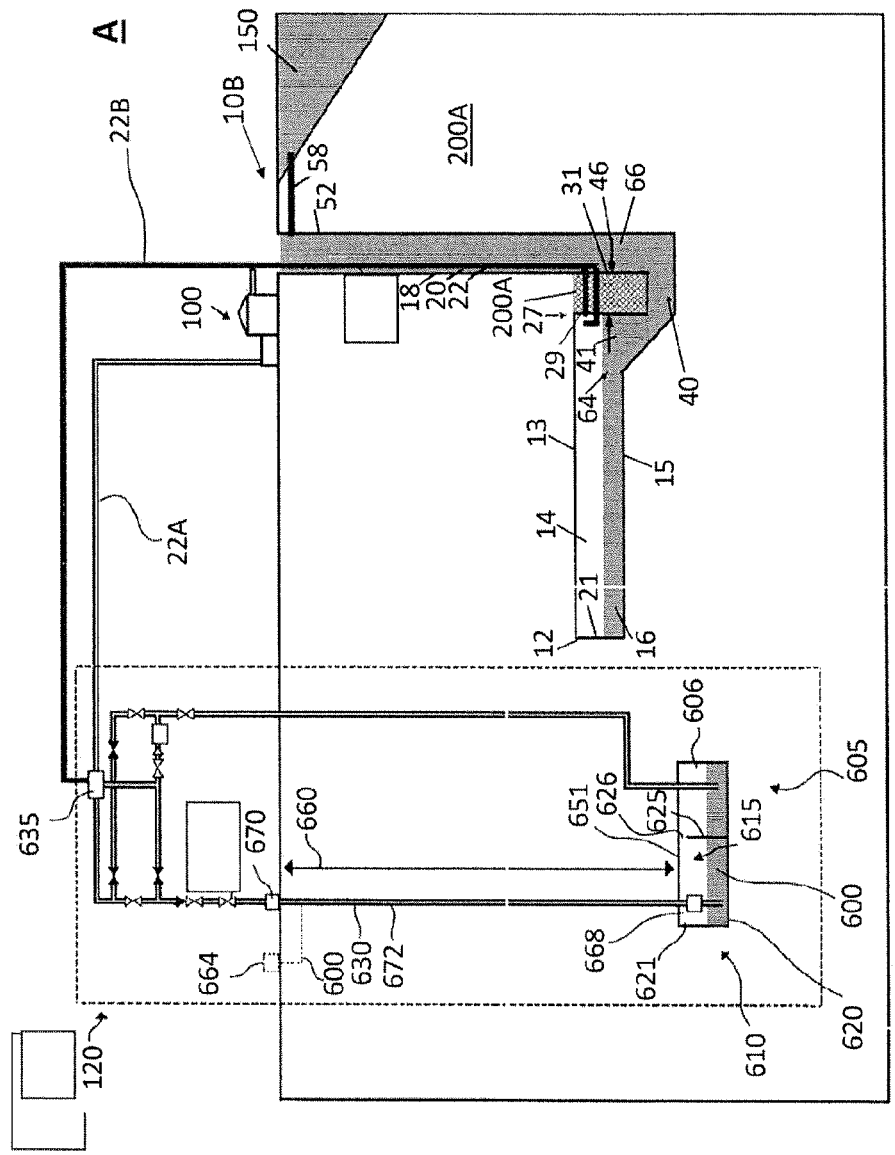
FIG. 3 is a schematic representation of another example of a hydrostatically compressed gas energy storage system.

In the embodiment of FIG. 1, the primary opening 27 is provided in the upper surface 13 of the accumulator 12. Alternatively, in other embodiments the primary opening 27 and any associated partition may be provided in different portions of the accumulator 12, including, for example, on a sidewall (such as sidewall 21 as shown in FIG. 3), in a lower surface (such as lower surface 15) or other suitable location. The location of the primary opening 27, and the associated partition, can be selected based on a variety of factors including, for example, the soil and underground conditions, the availability of existing structures (e.g. if the system 10A is being retrofit into some existing spaces, such as mines, quarries, storage facilities and the like), operating pressures, shaft configurations and the like. For example, some aspects of the systems 10A described herein may be retrofit into pre-existing underground chambers, which may have been constructed with openings in their sidewalls, floors and the like.

When the primary opening 27 extends along the sidewall 21 of the accumulator 12 as shown in the embodiment of FIG. 3, it may be positioned such that is contacted by only the gas layer 14 (i.e. toward the top of the accumulator 12), contacted by only the liquid layer 16 (i.e. submerged within the liquid layer 16 and toward the bottom of the accumulator) and/or by a combination of both the gas layer 14 and the liquid layer 16 (i.e. partially submerged and partially non-submerged in the liquid). The specific position of the free surface of the liquid layer 16 (i.e. the interface between the liquid layer 16 and the gas layer 14) may change while the system 10 is in use as gas is forced into (causing the liquid layer to drop) and/or withdrawn from the accumulator (allowing the liquid level to rise).

When the accumulator 12 is in use, at least one of the pressurized gas layer 14 and the liquid layer 16 may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24.

In some embodiments, for example if the compressed gas energy storage system is not hydrostatically compensated, the partition may be configured to resist substantially the entire internal accumulator force 41 and/or may be reinforced with the ground 200 or other suitable structures. Alternatively, an inwardly, (downwardly in this embodiment) acting force can be applied to the outer-surface 31 of the bulkhead 24 to help at least partially offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly.

In the present embodiment, the system 10 includes a shaft 18 that is configured so its lower end 43 is in communication with the opening 27 of the accumulator 12, and its upper end 48 that is spaced apart from the lower end 43 by a shaft height 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear, curved, or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 $m^3$ of water.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink 150 to allow water to flow into or out of the interior of the shaft 18 as required when the system 10 is in operational modes. Optionally, a flow control apparatus 59 (as shown in FIG. 1) may be provided in the water supply/replenishment conduit 58. The flow control apparatus 59 may include a valve, sluice gate, or other suitable mechanism. The flow control apparatus 59 can be open while the system 10 is in operational modes to help facilitate the desired flow of water between the shaft 18 and the water source/sink 150. Optionally, the flow control apparatus 59 can be closed to fluidly isolate the shaft 18 and the water source/sink 150 if desired. For example, the flow control apparatus 59 may be closed to help facilitate draining the interior 54 of the shaft 18 for inspection, maintenance or the like.

The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. In the illustrated example, the water source/sink 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal, it may be non-horizontal.

In this embodiment, the system 10A includes a gas flow path that provides fluid communication between the compressor/expander subsystem 100 and the accumulator 12. The gas flow path may include any suitable number of conduits, passages, hoses, pipes and the like and any suitable equipment may be provided in (i.e. in air flow communication with) the gas flow path, including, compressors, expanders, heat exchangers, valves, sensors, flow meters and the like. Referring to the example of FIG. 1, in this example the gas flow path includes a gas conduit 22 that is provided to convey compressed air between the compressed gas layer 14 and the compressor/expander subsystem 100, which can convert the potential energy of compressed air to and from electricity. Similarly, a liquid supply conduit 40 is configured to convey water between the liquid layer 16 and the water 20 in shaft 18. Each conduit 22 and 40 may be formed from any suitable material, including metal, the surrounding rock, plastic and the like.

In this example, the gas conduit 22 has an upper end 60 that is connected to the compressor/expander subsystem 100, and a lower end 62 that is in communication with the compressed gas layer 14. The gas conduit 22 is, in this example, positioned inside and extends within the shaft 18, and passes through the bulkhead 24 to reach the compressed gas layer 14. Positioning the gas conduit 22 within the shaft 18 may eliminate the need to bore a second shaft and/or access path from the surface to the accumulator 12. The positioning in the current embodiment may also leave the gas conduit 22 generally exposed for inspection and maintenance, for example by using a diver or robot that can travel through the water 20 within the shaft 18 and/or by draining some or all of the water from the shaft 18. Alternatively, as shown using dashed lines in FIG. 1 and in the embodiment of FIG. 3, the gas conduit 22 may be external the shaft 18. Positioning the gas conduit 22 outside the shaft 18 may help facilitate remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

The liquid supply conduit 40 is, in this example, configured with a lower end 64 that is submerged in the water layer 16 while the system 10 is in use and a remote upper end 66 that is in communication with the interior 54 of the shaft 18. In this configuration, the liquid supply conduit 40 can facilitate the exchange of liquid between the liquid layer 16 and the water 20 in the shaft 18. As illustrated in FIG. 1, the liquid supply conduit 40 can pass through the bulkhead 24 (as described herein), or alternatively, as shown using dashed lines, may be configured to provide communication between the liquid layer 16 and the water 20, but not pass through the bulkhead 24.

In this arrangement, as more gas is transferred into the gas layer 14 during an accumulation cycle or charging mode water in the water layer 16 can be displaced and forced upwards through the liquid supply conduit 40 into shaft 18 against the hydrostatic pressure of the water 20 in the shaft 18. More particularly, water can preferably freely flow from the bottom of accumulator 12 and into shaft 18, and ultimately may be exchanged with the source/sink 150 of water, via a replenishment conduit 58. Alternatively, any suitable type of flow limiting or regulating device (such as a pump, valve, orifice plate and the like) can be provided in the water conduit 40. When gas is removed from the gas layer 14, water can be forced from the shaft 18, through the water conduit 40, to refill the water layer 16. The flow through the replenishment conduit 58 can help ensure that a desired quantity of water 20 may be maintained within shaft 18 as water is forced into and out of the water layer 16, as excess water 20 can be drained from and make-up water can be supplied to the shaft 18. This arrangement can allow the pressures in the accumulator 12 and shaft 18 to at least partially, automatically re-balance as gas is forced into and released from the accumulator 12. That is, the pressure within the accumulator 12 may remain relatively constant (e.g. within about 5-10% of the desired accumulator pressure) while the system is in the charging mode. Any given system may be configured to have a desired accumulator pressure, but generally the accumulator pressures may be at least about 10 bar and generally may be between about 10 and about 80 bar or more, and may be between about 20 bar and about 70 bar, between about 40 and about 65 bar, and optionally between about 50 and about 60 bar.

Preferably, the lower end 64 of the liquid supply conduit 40 is positioned so that it is and generally remains submerged in the liquid layer 16 while the system 10 is in operational modes and is not in direct communication with the gas layer 14. In the illustrated example, the lower wall 15 is planar and is generally horizontal (parallel to plane 19, or optionally arranged to have a maximum grade of between about 0.01% to about 1%, and optionally between about 0.5% and about 1%, from horizontal), and the lower end 64 of the liquid supply conduit 40 is placed close to the lower wall 15. If the lower wall 15 is not flat or not generally horizontal, the lower end 64 of the liquid supply conduit 40 is preferably located in a low point of the accumulator 12 to help reduce the chances of the lower end 64 being exposed to the gas layer 14.

Similarly, to help facilitate extraction of gas from the gas layer when in a discharging mode, the lower end 62 of the gas conduit 22 is preferably located close to the upper wall 13, or if the upper wall 13 is not flat or generally horizontal at a high-point in the interior 23 of the accumulator 12. This may help reduce material trapping of any gas in the accumulator 12. For example, if the upper wall 13 were oriented on a grade, the point at which gas conduit 22 interfaces with the gas layer (i.e. its lower end 62) should be at a high point in the accumulator 12, to help avoid significant trapping of gas.

Preferably, as will be described, the pressure at which the quantity of water 20 bears against bulkhead 24 and can be maintained so that magnitude of the counter force 46 is as equal, or nearly equal, to the magnitude of the internal accumulator force 41 exerted by the compressed gas in compressed gas layer 14 stored in accumulator 12. In the illustrated embodiment, operating system 10 so as to maintain a pressure differential (i.e. the difference between gas pressure inside the accumulator 12 and the hydrostatic pressure at the lower end 43 of the shaft 18) within a threshold amount—an amount preferably between 0 and 4 Bar, such as 2 Bar—the resulting net force acting on the bulkhead 24 (i.e. the difference between the internal accumulator force 41 and the counter force 46) can be maintained below a pre-determined threshold net force limit.

In this embodiment, a gas conduit 22 is provided to convey compressed air between the compressed gas layer 14 and the compressor/expander subsystem 100, which can convert compressed air energy to and from electricity. Similarly, a liquid conduit 40 is configured to convey water between the liquid layer 16 and the water 20 in shaft 18. Each conduit 22 and 40 may be formed from any suitable material, including metal, plastic and the like.

Figure 2:
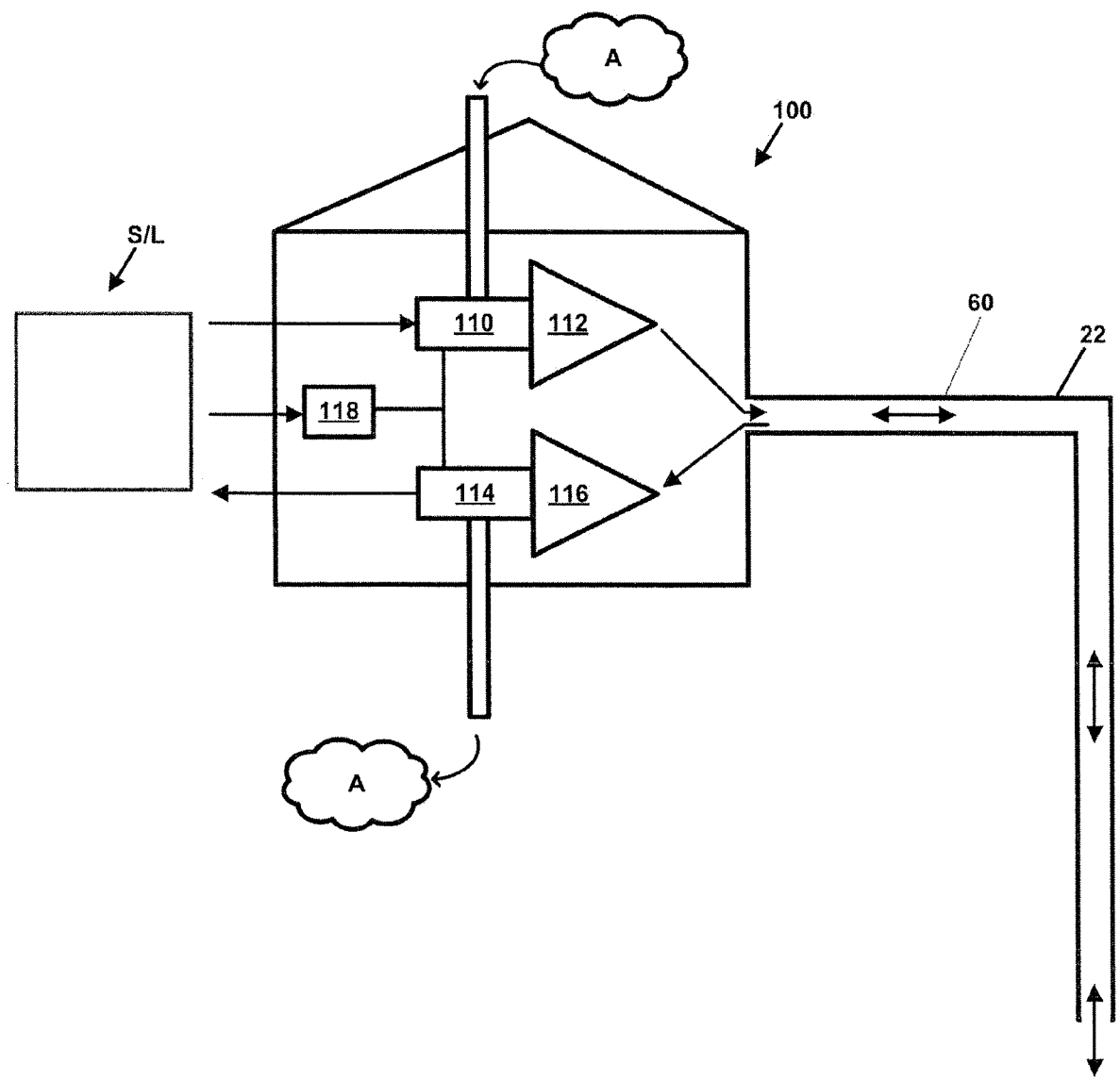
FIG. 2 is a schematic representation of a portion of the system of FIG. 1.

FIG. 2 is a schematic view of components of one example of a compressor/expander subsystem 100 for the compressed gas energy storage system 10 described herein. In this example, the compressor/expander subsystem 100 includes a compressor 112 of single or multiple stages, driven by a motor 110 that is powered, in one alternative, using electricity from a power grid or by a renewable power source or the like, and optionally controlled using a suitable controller 118. Compressor 112 is driven by motor 110 during an accumulation stage of operation, and draws in atmospheric air A, compresses the air, and forces it down into gas conduit 22 for storage in accumulator 12 (via thermal storage subsystem 120 (see FIG. 1 for example) in embodiments including same). Compressor/expander subsystem 100 also includes an expander 116 driven by compressed air exiting from gas conduit 22 during an expansion stage of operation and, in turn, driving generator 114 to generate electricity. After driving the expander 116, the expanded air is conveyed for exit to the atmosphere A. While shown as separate apparatuses, the compressor 112 and expander 116 may be part of a common apparatus, as can a hybrid motor/generator apparatus. Optionally, the motor and generator may be provided in a single machine.

Air entering or leaving compressor/expander subsystem 100 may be conditioned prior to its entry or exit. For example, air exiting or entering compressor/expander subsystem 100 may be heated and/or cooled to reduce undesirable environmental impacts or to cause the air to be at a temperature suited for an efficient operating range of a particular stage of compressor 112 or expander 116. For example, air (or other gas being used) exiting a given stage of a compressor 112 may be cooled prior to entering a subsequent compressor stage and/or the accumulator 12, and/or the air may be warmed prior to entering a given stage of an expander 116 and may be warmed between expander stages in systems that include two or more expander stages arranged in series.

Controller 118 operates compressor/expander subsystem 100 so as to switch between accumulation and expansion stages as required, including operating valves for preventing or enabling release of compressed air from gas conduit 22 on demand.

Optionally, the system 10A may include a thermal storage subsystem 120 (illustrated schematically in FIG. 1) that is configured to transfer heat/thermal energy out of and preferably also into the gas flowing through the gas flow path between the accumulator and the compressor/expander subsystem 100. Preferably, the thermal storage subsystem 120 is configured to extract thermal energy from the gas exiting at least one of the one or more compression stages in a given compressor/expander subsystem 100, and preferably being configured to extract heat from the gas exiting each compression stage 112. The extracted thermal energy can then be stored for a period of time, and then reintroduced into the gas as it is removed from the accumulator 12 and passed through one or more expanders 116.

FIG. 3 is a schematic representation of another example of a compressed gas energy storage system 10B with a thermal storage subsystem 120 that is provided in the gas flow path between the compressor/expander subsystem 100 and the accumulator 12. The compressed gas energy storage system 10B is analogous to the compressed gas energy storage system 10A, and like features are identified using like reference characters. While one example is explained herein, other suitable thermal storage subsystems may be utilized in other embodiments, including those described in PCT/CA2018/050112 and PCT/CA2018/050282, which are incorporated herein by reference. The thermal storage subsystem 120 may also be used in combination with the systems 10A and 10B, and other systems described herein.

In the example of FIG. 3, the gas conduit 22 that conveys the compressed gas between the compressed gas layer 14 and compressor/expander subsystem 100 includes an upper portion 22A that extends between the compressor/expander subsystem 100 and thermal storage subsystem 120, and a lower portion 22B that extends between thermal storage subsystem 120 and accumulator 12.

The thermal storage subsystem 120 may include any suitable type of thermal storage apparatus, including, for example latent and/or sensible storage apparatuses. The thermal storage apparatus(es) may be configured as single stage, two stage and/or multiple stage storage apparatus(es). Similarly, the thermal storage subsystem 120 may include one or more heat exchangers (to transfer thermal energy into and/or out of the thermal storage subsystem 120) and one or more storage apparatuses (including, for example storage reservoirs for holding thermal storage fluids and the like). Any of the thermal storage apparatuses may either be separated from or proximate to their associated heat exchanger and may also incorporate the associated heat exchanger in a single compound apparatus (i.e. in which the heat exchanger is integrated within the storage reservoir). Preferably, the heat exchangers utilized in the thermal storage subsystem 120 are provided in the gas flow path and are operable to transfer thermal energy between the compressed gas travelling through the gas flow path and the thermal storage media (which may be a solid, liquid or gas).

The exchangers may be any suitable type of heat exchanger for a given type of thermal storage media, and may include, for example, indirect heat exchangers or direct heat exchangers. The preferable type of heat exchanger for a given system may depend on a variety of factors and/or elements of the system. For example, a direct heat exchanger (i.e. that permits direct contact between the two sides/streams of the exchanger) may help facilitate for more conductivity between the compressed gas and thermal storage media and may, under some circumstances, be relatively more efficient in transferring thermal energy between the two than a comparable indirect heat exchanger. A direct heat exchanger may be preferred when using solid thermal storage media, such as rocks or gravel and may also be used in combination with a thermal storage liquid if both the gas and liquid streams are maintained under suitable conditions to help maintain the thermal storage liquid in its liquid state, and to avoid boiling and/or mixing of the gas stream and liquid stream.

An indirect heat exchanger may be preferable in systems in which the compressed gas is to be kept separate from the thermal storage media, such as if the thermal storage media needs to be kept under specific conditions, including pressure and/or if both streams in the heat exchanger are gaseous (or would boil if a liquid) such that there would be a mixing of the thermal storage media and the compressed system gas within the heat exchanger.

In the illustrated embodiment, substantial portions of the thermal storage subsystem 120 are located underground, which may help reduce the use of above-ground land and may help facilitate the use of the weight of the earth/rock to help contain the pressure in the storage reservoir. That is, the outward-acting pressure within the storage reservoir containing the heated and, optionally non-heated thermal storage media, can be substantially balanced by the inwardly-acting forces exerted by the earth and rock surrounding the first reservoir. In some examples, if a liner or other type of vessel are provided in the storage reservoir such structures may carry some of the pressure load but are preferably backed-up by and/or supported by the surrounding earth/rock. This can help facilitate pressurization of the storage reservoir to the desired storage pressures, without the need for providing a manufactured pressure vessel that can withstand the entire pressure differential. In this example, the thermal storage subsystem 120 also employs multiple stages including, for example, multiple sensible and/or latent thermal storage stages such as stages having one or more phase change materials and/or pressurized water, or other heat transfer fluid arranged in a cascade. It will be noted that, if operating the system for partial storage/retrieval cycles, the sizes of the stages may be sized according to the time cycles of the phase change materials so that the phase changes, which take time, take place effectively within the required time cycles.

In general, as gas is compressed by the compressor/expander subsystem 100 when in the charging mode and is conveyed for storage towards accumulator 12, the heat of the compressed gas can be drawn out of the compressed gas and into the thermal storage subsystem 120. In this way, at least a portion of the heat energy is saved for future use instead of, for example being leached out of the compressed gas into water 20 or in the liquid layer 16, and accordingly substantially lost (i.e. non-recoverable by the system 10).

Similarly, when in a discharge mode as gas is released from accumulator 12 towards compressor/expander subsystem 100 it can optionally be passed through thermal storage subsystem 120 to re-absorb at least some of the stored heat energy on its way to the expander stage of the compressor/expander subsystem 100. Advantageously, the compressed gas, accordingly heated, can reach the compressor/expander subsystem 100 at a desired temperature (an expansion temperature—that is preferably warmer/higher than the accumulator temperature), and may be within about 10° C. and about 60° C. of the exit temperature in some examples, that may help enable the expander to operate within its relatively efficient operating temperature range(s), rather than having to operate outside of the range with cooler compressed gas.

In embodiments of the thermal storage subsystem 120 employing sensible heat storage, pressurized water, or any other suitable thermal storage fluid/liquid and/or coolant, may be employed as the sensible thermal storage medium. Optionally, such systems may be configured so that the thermal storage liquid remains liquid while the system 10A or 10B is in use and does not undergo a meaningful phase change (i.e. does not boil to become a gas). This may help reduce the loss of thermal energy via the phase change process. For example, such thermal storage liquids (e.g. water) may be pressurized and maintained at an operating pressure that is sufficient to generally keep the water in its liquid phase during the heat absorption process as its temperature rises. That is, the reservoir and/or conduits containing a thermal storage liquid can be pressurized to a pressure that is greater than atmospheric pressure, and optionally may be at least between about 10 and 60 bar, and may be between about 15 and 30 bar, and between about 15 and 20 bar, so that the thermal storage liquid can be heated to a temperature that is greater than its boiling temperature at atmospheric pressure.

In some embodiments, the pressure within the thermal storage subsystem 120 may be maintained by allowing the gaseous space of the thermal storage reservoir to contain the thermal storage media in its gaseous state (e.g. steam when water is the thermal fluid). In this embodiment, the vessel will be maintained substantially at the boiling pressure of the thermal liquid at the storage temperature by the vapour liquid equilibrium of the liquid and gaseous thermal fluid in the thermal storage vessel. As the system is charging and the liquid level in thermal storage reservoir increases, gaseous thermal fluid will condense in response to the reducing gaseous volume such that the pressure within the tank is maintained substantially at or above the boiling pressure of the thermal fluid at the storage temperature. As the system is discharging and the liquid level in thermal storage reservoir decreases, a portion of the liquid thermal fluid will boil/evaporate in response to the increasing gaseous volume such that the pressure within the tank is maintained substantially at or above the boiling pressure of the thermal fluid at the storage temperature.

Optionally, the pressurized water may be passed through a heat exchanger or series of heat exchangers to capture and return the heat from and to the gas stream that is entering and exiting the accumulator, via conduit 22. Generally, sensible heat storage may be useful for storing heat of temperatures of 100 degrees Celsius and higher. Pressurizing the water in these systems may help facilitate heating the water to temperatures well above 100 degrees Celsius (thereby increasing its total energy storage capability) without boiling.

Optionally, at least some of the gas conduit 22 may be external the shaft 18 so that it is not submerged in the water 20 that is held in the shaft 18. In some preferred embodiments, the compressed gas stream will transfer its thermal energy to the thermal storage system 120 (for example by passing through heat exchangers 635 described herein) before the compressed gas travels underground. That is, some portions of the thermal storage subsystem 120 and at least the portion of the gas conduit that extends between the compressor/expander subsystem 100 and the thermal storage subsystem 120 may be provided above ground, as it may be generally desirable in some embodiments to transfer as much excess heat from the gas to the thermal storage subsystem 120, and reduce the likelihood of heat being transferred/lost in the water 20, ground or other possible heat sinks along the length of the gas conduit 22. Similar considerations can apply during the expansion stage, as it may be desirable for the warmed gas to travel from the thermal storage subsystem 120 to the compressor/expander subsystem 100 at a desired temperature, while reducing the heat lost in transit.

Referring again to FIG. 3, in this example the thermal storage subsystem 120 is configured to store thermal energy from the incoming pressurized gas in a thermal storage liquid 600. Optionally, the thermal storage liquid 600 can be pressurized in the thermal storage subsystem 120 to a storage pressure that is higher than atmospheric pressure.

Pressurizing the thermal storage liquid 600 may allow the thermal storage liquid 600 to be heated to relatively higher temperatures (i.e. store relatively more thermal energy and at a more valuable grade) without boiling, as compared to the same liquid at atmospheric pressure. That is, the thermal storage liquid 600 may be pressurized to a storage pressure and heated to a thermal storage temperature such that substantially all of the thermal storage liquid 600 is maintained as a liquid while the system is in use (which may help reduce energy loss through phase change of the thermal storage liquid). In the embodiments illustrated, the storage temperature may be between about 150 and about 500 degrees Celsius, and preferably may be between about 150 and 250 degrees Celsius. The storage temperature is preferably at or below a boiling temperature of the thermal storage liquid 600 when at the storage pressure but may be, and in some instances preferably will be the above boiling temperature of the thermal storage liquid 600 if it were at atmospheric pressure. In this example, the thermal storage liquid 600 can be water, but in other embodiments may be engineered heat transfer/storage fluids, coolants, oils and the like. When sufficiently pressurized, water may be heated to a storage temperature of about 250 degrees Celsius or higher without boiling, whereas water at that temperature would boil at atmospheric pressure.

Optionally, the thermal storage liquid 600 can be circulated through a suitable heat exchanger to receive heat from the compressed gas stream travelling through the gas supply conduit 22 during the charging mode (downstream from the compressor/expander subsystem 100). The heated thermal storage liquid 600 can then be collected and stored in a suitable storage reservoir (or more than one storage reservoirs) that can retain the heated thermal storage liquid 600 and can be pressurized to a storage pressure that is greater than atmospheric pressure (and may be between about 10 and 60 bar, and may be between about 10 and 25 bar, and between about 15 and 20 bar).

The thermal storage reservoir may be any suitable type of structure, including an underground chamber/cavity (e.g. formed within the surrounding ground 200) or a fabricated tank, container, a combination of a fabricated tank and underground chamber/cavity, or the like. If configured to include an underground chamber, the chamber may optionally be lined to help provide a desired level of liquid and gas impermeability and/or thermal insulation. For example, underground chambers may be at least partially lined with concrete, polymers, rubber, plastics, geotextiles, composite materials, metal and the like. Configuring the storage reservoir to be at least partially, and preferably at least substantially impermeable may help facilitate pressurizing the storage reservoir as described herein. Preferably, the underground chamber may be a repurposed or reconfigured structure that was previously used for another purpose during the construction or operation of the system 10. For example, a thermal storage reservoir may be provided in the interior of a construction shaft or decline or other such structure that was used for a non-thermal storage related purpose during the construction of the system 10.

Fabricated tanks may be formed from any suitable material, including concrete, metal, plastic, glass, ceramic, composite materials and the like. Optionally, the fabricated tank may include concrete that is reinforced using, metal, fiber reinforced plastic, ceramic, glass or the like, which may help reduce the thermal expansion difference between the concrete and the reinforcement material.

In this embodiment the storage reservoir 610 of the thermal storage subsystem 120 includes a chamber 615 that is positioned underground, at a reservoir depth 660. Preferably, the reservoir depth 660 is less than the depth of the accumulator 12, which in this example corresponds to the shaft height 50. Optionally, the thermal storage subsystem 120 can be configured so that the reservoir depth 660 is at least about ⅓ of the accumulator depth/shaft height 50, or more. For example, if the accumulator 12 is at a depth of about 300 m, the reservoir depth 660 is preferably about 100 m or more. For example, having the reservoir depth 660 being less than the accumulator depth 50 may help facilitate sufficient net positive suction head to be available to the fluid transfer pumps and other equipment utilized to pump the thermal storage liquid 600 through the thermal storage subsystem 120 (for example between source reservoir 606 and storage reservoir 610). This may allow the transfer pumps to be positioned conveniently above ground and may help reduce the chances of damaging cavitation from occurring.

The reservoir depth 660 being at least ⅓ the depth 50 of the accumulator 12 may also allow for relatively higher rock stability of the subterranean thermal storage cavern, such as chamber 615. The geostatic gradient, which provides an upper limit on pressure inside underground rock caverns, is typically about 2.5-3 times the hydrostatic gradient. Given this rock stability criterion, the shallowest reservoir depth 660 may be approximately three times less than the accumulator depth in some embodiments, such as when the storage pressure is generally equal than the accumulator pressure.

In this example, the chamber 615 is a single chamber having a chamber interior 616 that is at least partially defined by a bottom chamber wall 620, a top chamber wall 651, and a chamber sidewall 621. The chamber 615 is connected to one end of a liquid inlet/outlet passage 630 (such as a pipe or other suitable conduit) whereby the thermal storage liquid 600 can be transferred into and/or out of the chamber 615. In addition to the layer of thermal storage liquid 600, a layer of cover gas 602 is contained in the chamber 615 and overlies the thermal storage liquid 600. Like the arrangement used for the accumulator 12, the layer of cover gas 602 can be pressurized using any suitable mechanism to help pressurize the interior of the chamber 615 and thereby help pressurize the thermal storage liquid 600. The cover gas may be any suitable gas, including air, nitrogen, thermal storage liquid vapour, an inert gas and the like. Optionally, at least the subterranean portions of the liquid inlet/outlet passage 630 (i.e. the portions extending between the heat exchanger 635 and the storage reservoir 610) may be insulated (such as by a vacuum sleeve, or insulation material) to help reduce heat transfer between the thermal storage fluid and the surrounding ground.

When the thermal storage subsystem 120 is in use, a supply of thermal storage liquid can be provided from any suitable thermal storage liquid source 605. The thermal storage liquid source can be maintained at a source pressure that may be the same as the storage pressure or may be different than the storage pressure. For example, the thermal storage liquid source may be at approximately atmospheric pressure, which may reduce the need for providing a relatively strong, pressure vessel for the thermal storage liquid source. Alternatively, the thermal storage liquid source may be pressurized. The thermal storage liquid source may also be maintained at a source temperature that is lower, and optionally substantially lower than the storage temperature. For example, the thermal storage liquid source may be at temperatures of between about 2 and about 100 degrees Celsius and may be between about 4 and about 50 degrees Celsius. Increasing the temperature difference between the incoming thermal storage liquid from the source and the storage temperature may help increase the amount of heat and/or thermal energy that can be stored in the thermal storage subsystem 120.

The thermal storage liquid source 605 may have any suitable configuration and may have the same construction as an associated storage reservoir or may have a different configuration. For example, in the embodiment of FIG. 3 the thermal storage liquid source 605 includes a source reservoir 606 that is configured in the same underground chamber as the thermal fluid storage chamber 615. In this arrangement, a closed loop system can be provided, including the storage reservoir 610 and the source reservoir 606. Alternatively, the thermal storage liquid source 605 may include a source reservoir 606 that is configured as an above-ground vessel, and optionally need not be pressurized substantially above atmospheric pressure. In other embodiments, the thermal liquid source 605 may include a body of water such as the lake 150, water 20 from the shaft 18, liquid from the liquid layer 16 in the accumulator 12 (or from any other portion of the overall system 10), water from a municipal water supply or other such sources and combinations thereof.

In the embodiment of FIG. 3, the source reservoir 606 and storage reservoir 610 are adjacent each other and are portions of a generally common underground chamber. This may help simplify construction of the thermal storage subsystem 120 as an excavation of a single chamber may provide space for both the source reservoir 606 and storage reservoir 610. This may also help simplify piping and valving between the source reservoir 606 and the storage reservoir 610.

In some examples, the interiors of the storage reservoir 610 and source reservoir 606 may be substantially fluidly isolated from each other, such that neither gas nor liquid can easily/freely pass between reservoirs 606 and 610. Alternatively, as illustrated in Figure, the interiors of the storage reservoir 610 and source reservoir 606 may be in gas flow communication with each other, such as by providing the gas exchange passage 626 that can connect the layer of cover gas 602 with a layer of cover gas 608 in the source reservoir 606. The gas exchange passage 626 can be configured to allow free, two-way flow of gas between the storage reservoir 610 and the source reservoir 606 or may be configured to only allow one-way gas flow (in either direction). Providing a free flow of gas between the storage reservoir 610 and the source reservoir 606 may help automatically match the pressures within the storage reservoir 610 and the source reservoir 606. Preferably, when arranged in this manner, the interior of the storage reservoir 610 remains at least partially isolated from the interior of the source reservoir 606 during normal operation to inhibit, and preferably prevent mixing of the relatively hot cover gas associated with the thermal storage liquid 600 in the storage reservoir 610 with the relatively cooler cover gas associated with the thermal storage liquid in the source reservoir 606. In this example, the storage reservoir 610 and source reservoir 606 share a common sidewall, which can function as an isolating barrier 625 to prevent liquid mixing between the reservoirs. This common sidewall may be insulated to prevent unwanted heat transfer from the relatively hot thermal storage liquid 600 in the storage reservoir 610 to the relatively cooler thermal storage liquid in the source reservoir 606

When the compressed gas energy storage systems are in a charging mode, compressed gas is being directed into the accumulator 12 and the thermal storage liquid 600 can be drawn from the thermal storage liquid source 605, passed through one side of a suitable heat exchanger 635 (including one or more heat exchanger stages) to receive thermal energy from the compressed gas stream exiting the compressor/expander subsystem 100, and then conveyed/pumped through the liquid inlet/outlet passage 630 and into the storage reservoir 610 for storage at the storage pressure.

When the compressed gas energy storage system is in a storage mode, compressed gas is neither flowing into or out of the accumulator 12 or thorough the heat exchanger 635, and the thermal storage liquid 600 need not be circulated through the heat exchanger 635.

The thermal storage liquid 600 can be conveyed through the various portions of the thermal storage subsystem 120 using any suitable combination of pumps, valves, flow control mechanisms and the like. Optionally, an extraction pump may be provided in fluid communication with, and optionally at least partially nested within, the storage reservoir 610 to help pump the thermal storage liquid 600 from the storage reservoir 610 up to the surface. Such a pump may be a submersible type pump and/or may be configured so that the pump and its driving motor are both located within the storage reservoir 610. Alternatively, the pump may be configured as a progressive cavity pump having a stator and rotor assembly 668 (including a rotor rotatably received within a stator) provided in the storage reservoir 610 and positioned to be at least partially submerged in the thermal storage liquid 600, a motor 670 that is spaced from the stator and rotor assembly 668 (on the surface in this example) and a drive shaft 672 extending therebetween. In this example, the drive shaft 672 is nested within the liquid inlet/outlet passage 630 extending to the storage reservoir 610, but alternatively may be in other locations.

Optionally, to help pressurize the storage reservoir 610, the thermal storage subsystem 120 may include any suitable type of pressurization system and may include a thermal storage compressor system that can help pressurize the layer of cover gas 602 in the storage reservoir. This may include a thermal storage compressor 664 that is in fluid communication with the cover gas layer. The compressor itself may be on the surface and may be connected to the cover gas layer by a compressor gas conduit 666 that may be spaced from, or at least partially integrated with the liquid inlet/outlet passage 630. Optionally, the compressor 664 may be configured to raise the pressure of the cover gas layer 602 from atmospheric pressure to the storage pressure. The compressor 664, and any other aspects of the thermal storage subsystem 120 may be controlled at least partially automatically by the controller 118. While shown as a separate compressor 664, pressure for the storage reservoir 610 may at least partially be provided by the compressor/expander subsystem 100.

Figure 4:
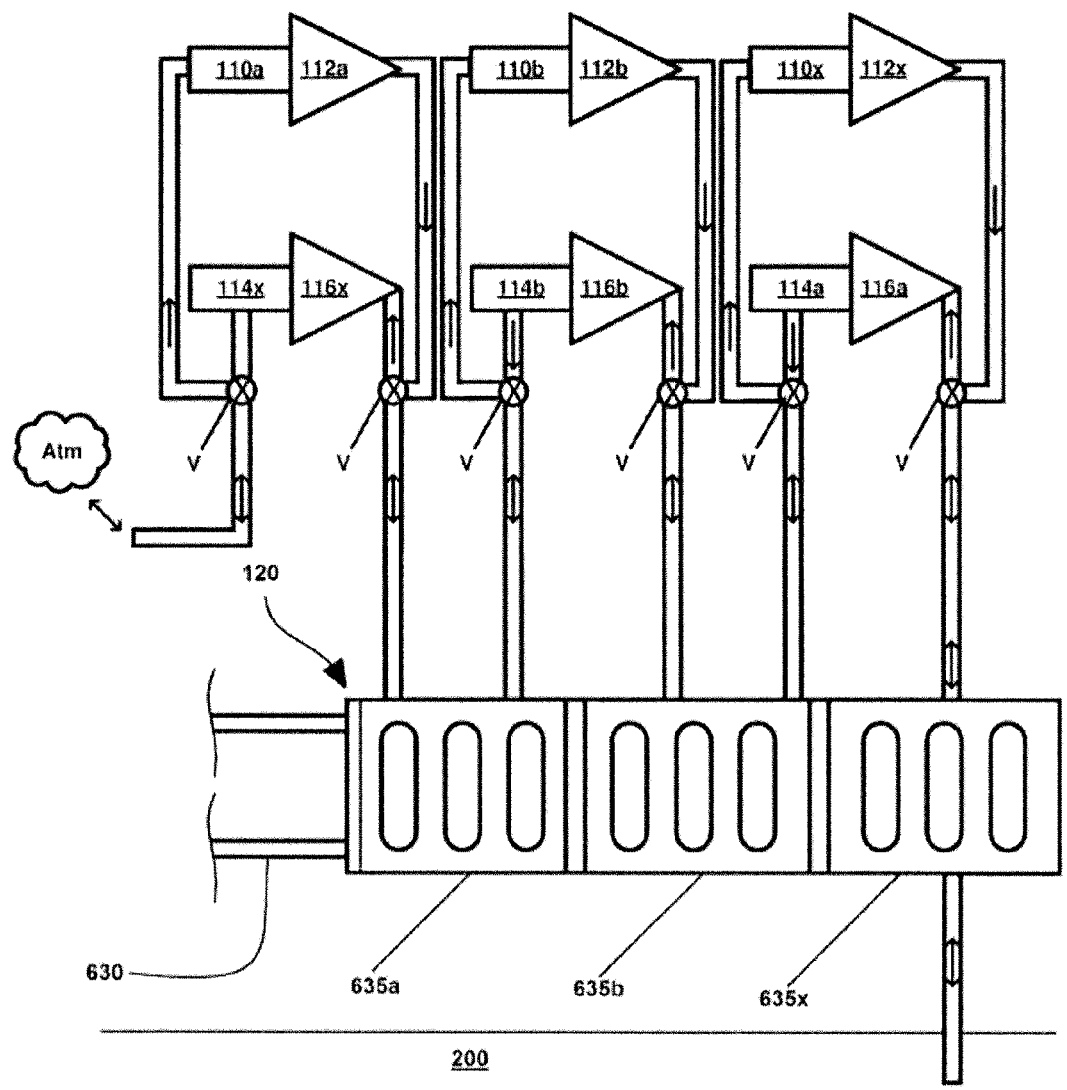
FIG. 4 is a schematic view of components of an alternative compressor/expander subsystem for a compressed gas energy storage system, with pairs of compression and expansion stages each associated with a respective stage of a thermal storage subsystem.

FIG. 4 is a schematic view of components of on example of a compressor/expander subsystem for use with a suitable compressed gas energy storage system (including the hydrostatically compensated systems described herein and other systems that are not hydrostatically compensated), with pairs of compression and expansion stages each associated with a respective heat exchanger of the thermal storage subsystem 120.

In this embodiment, a given exchanger of the thermal storage subsystem 120 is used during both the compression and expansion stages, by routing air being conveyed into the accumulator 12 through the thermal storage subsystem 120 to remove heat from the air either prior to a subsequent stage of compression or prior to storage, and routing air being conveyed out of accumulator 12 through the thermal storage subsystem 120 to add heat to the air before each stage of expansion. In a sense, therefore, pairs of compression and expansion stages share a heat exchanger 635a, 635b and 635x and airflow is controlled using valves V, as shown in FIG. 4. This embodiment may be useful where the "same" heat/thermal energy received from the compressed air being conveyed through the air flow path towards the accumulator 12 during a storage phase is intended to be reintroduced and/or transferred into the air being released from the accumulator 12 during a release phase.

The embodiment of FIG. 4 has a first heat exchanger 635a provided in the gas flow path and operable to transfer thermal energy between the compressed gas travelling through the gas flow path and the thermal storage liquid. A further second heat exchanger 635b is provided in the gas flow path downstream from the first heat exchanger and operable to transfer thermal energy between the compressed gas travelling through the gas flow path and the thermal storage liquid. For clarity, downstream refers to the path of compressed gas in charging mode. A further third heat exchanger 635x is provided in the gas flow path downstream from the second heat exchanger and operable to transfer thermal energy between the compressed gas travelling through the gas flow path and the thermal storage liquid.

Usage of multiple heat exchangers may allow the system to operate under desirable conditions. Since there are multiple stages of heat exchangers in this arrangement, no single heat exchanger needs to be responsible for capturing all the thermal energy from the compressed gas. Instead, there are multiple opportunities for the thermal energy in the compressed gas to be transferred to the thermal storage media. The thermal storage media can therefore be kept at a lower temperature, which may reduce the pressure to which the thermal storage liquid needs to be pressurized to be maintained its liquid state, may optionally eliminate the need to pressurize the thermal storage liquid generally above atmospheric pressure and/or may help reduce the need for thermal insulative material in the thermal storage reservoir or other portions of the thermal storage subsystem 120.

Similarly, in the discharging mode, the gas exiting the accumulator may receive thermal energy from the thermal storage media at each of the heat exchangers. The additional heat exchangers may help improve the overall efficiency of the thermal energy transfer back to the gas.

Figure 5:
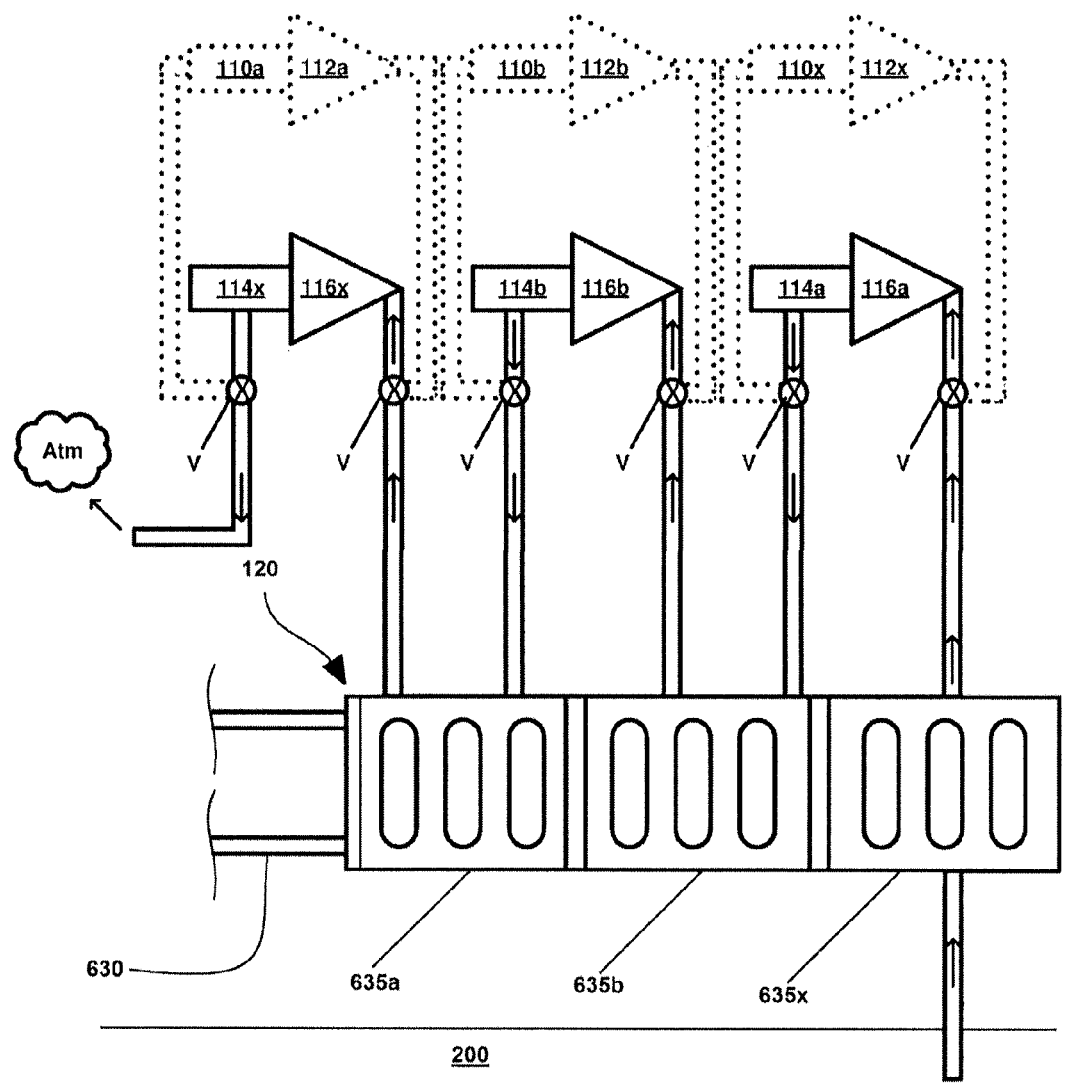
FIG. 5 is a schematic view of components of the alternative compressor/expander subsystem of FIG. 4, showing airflow during an expansion (discharge) phase from storage through multiple expanders and respective stages of a thermal storage subsystem.

FIG. 5 is a schematic view of components of the alternative example of a compressor/expander subsystem, showing airflow during an expansion (discharging) phase from storage through multiple expander stages and multiple respective heat exchangers of the thermal storage subsystem 120. In this phase, through control of valves V, airflow is directed through multiple expansion stages. The dashed lines show multiple compression stages to which the airflow is prevented during an expansion phase by the control of valves V.

Figure 6:
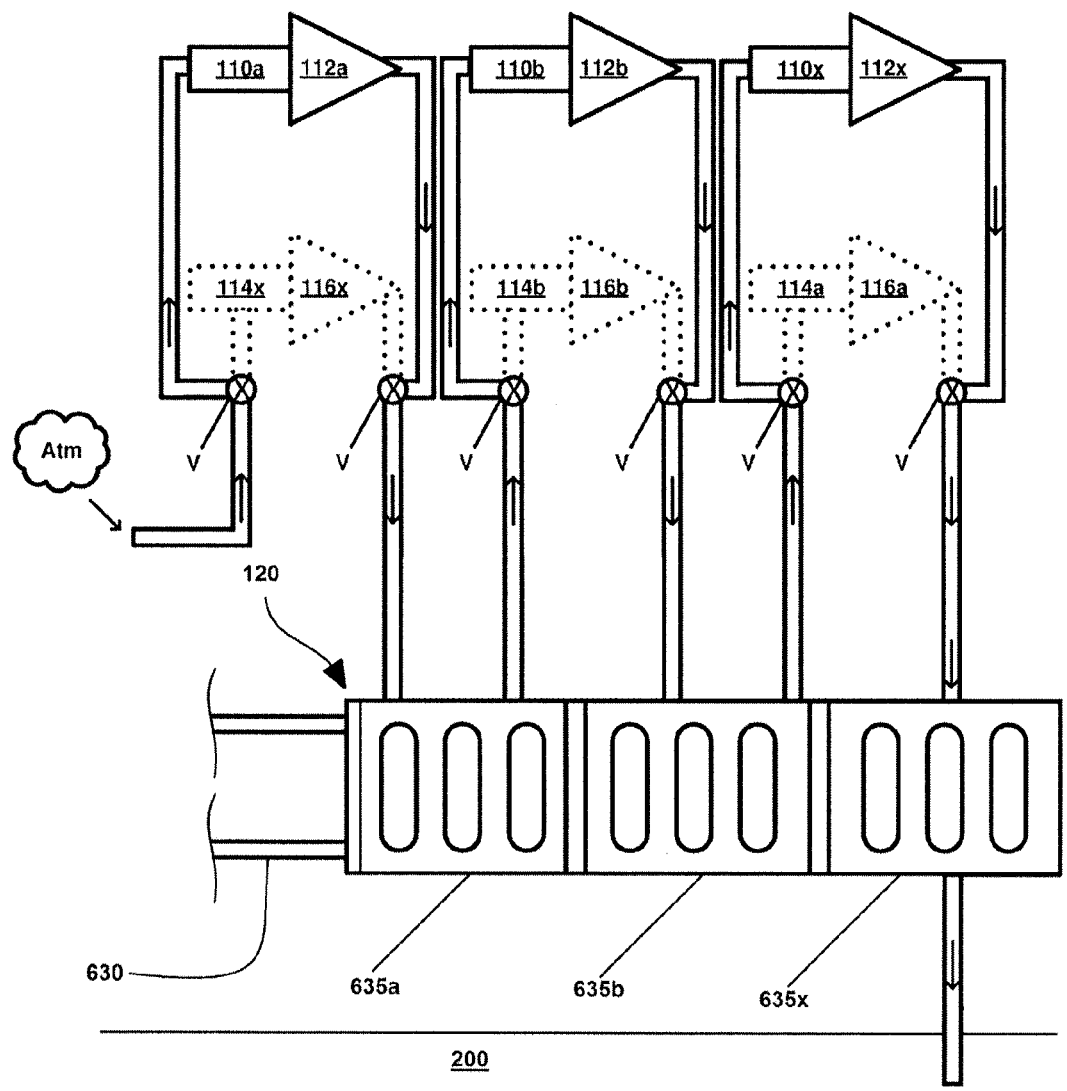
FIG. 6 is a schematic view of components of the alternative compressor/expander subsystem of FIG. 4, showing airflow during a compression (charge) phase from the ambient through multiple compressors and respective stages of a thermal storage subsystem.

FIG. 6 is a schematic view of components of the alternative compressor/expander subsystem of FIG. 4, showing airflow during a compression (charging) phase from the ambient A through multiple compressor stages and multiple respective heat exchangers of the thermal storage subsystem 120. In this phase, through control of valves V, airflow is directed through multiple compression stages. The dashed lines show multiple expansion stages to which the airflow is prevented during the compression phase by the control of valves V.

Locating the thermal storage subsystem 120 above the accumulator 12, and thus physically closer to the compression/expansion subsystem 100, may help reduce the length of piping required, which may help reduce the costs of piping, installation and maintenance, as well as reduced fluid-transfer power requirements.

In certain preferred embodiments, the compression/expander subsystem 100 for use with a suitable compressed gas energy storage system may include three compression/expansion stages or more, each associated with a respective heat exchanger of the thermal storage subsystem 120.

Figure 7:
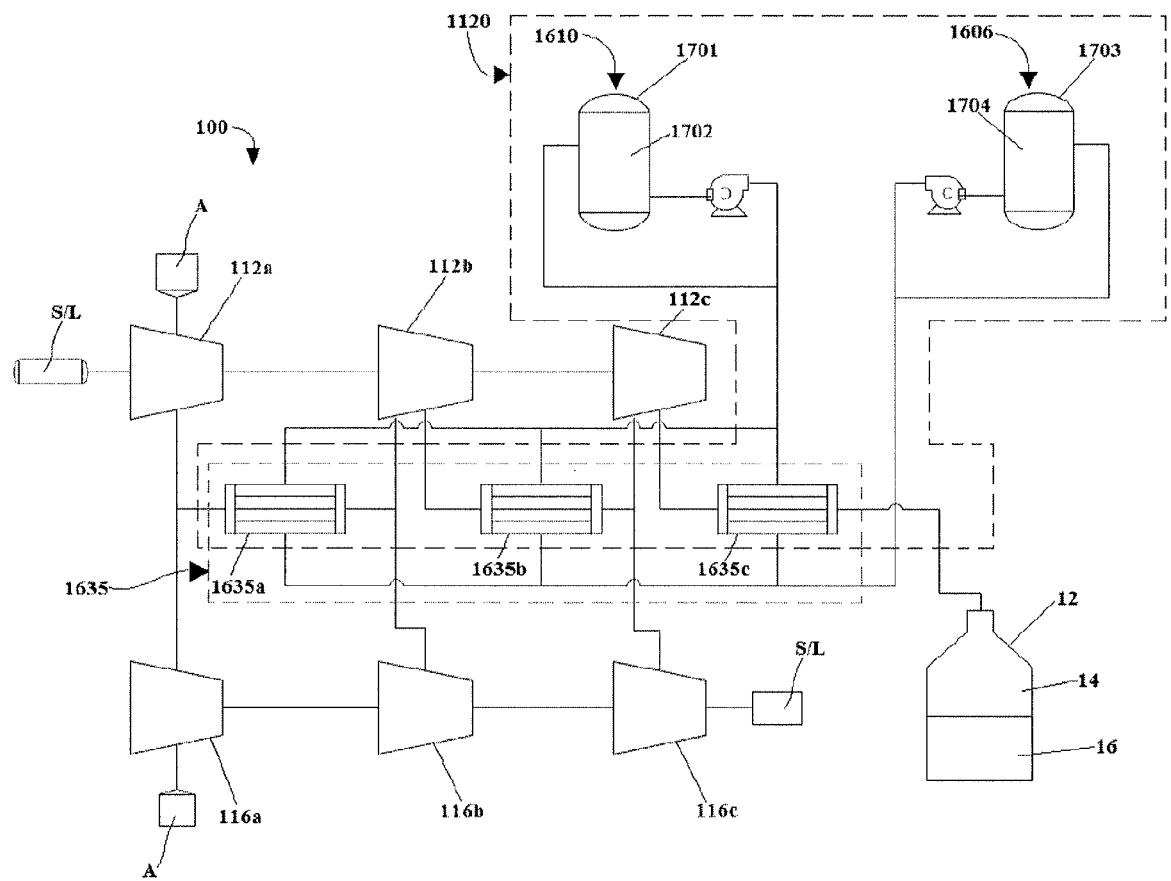
FIG. 7 is a schematic view of components of one embodiment of a compressor/expander subsystem for a compressed gas energy storage system, with three pairs of compression and expansion stages each associated with a respective stage of a thermal storage sub system.

Referring to FIG. 7, another example of a thermal storage subsystem 1120 for use with any of the systems 10 described herein is illustrated. The thermal storage subsystem 1120 is analogous to the thermal storage subsystem 120 and like features are annotated using like reference characters indexed by 1000.

This embodiment of the thermal storage subsystem 1120 includes a heat exchanger assembly 1635 that includes three heat exchangers 1635a, 1635b and 1635c (each shown as a single physical exchanger for ease of illustration, but which may include two or more physical exchangers and associated hardware). This thermal storage subsystem 1120 is configured to be used in combination with any suitable compression and expansion subsystem 100 that includes three compression and expansion stages, including those described herein. The thermal storage subsystem 1120 also includes a source reservoir 1606 for holding a supply of relatively cool thermal storage fluid (water in this embodiment) at a source temperature and source pressure and an associated thermal storage reservoir 1610 for containing relatively warmer thermal storage fluid at a thermal storage temperature that is higher than the source temperature and at a thermal storage pressure that may optionally be higher than the source pressure and is preferably higher than atmospheric pressure.

Optionally, it may be desirable to operate the thermal storage system 1120 such that the heated fluid that is contained in the storage reservoir 1610 is heated to a storage temperature that is greater than the vapour temperature/boiling point of the liquid (i.e. water) at atmospheric pressure. To help maintain the fluid in its liquid state, at least some portions the thermal storage system 1120, such as the storage reservoir 1610 and conduits connected thereto, are preferably pressurized to a pressure that is greater than atmospheric pressure and is sufficient to inhibit boiling of the thermal storage fluid/water when at the storage temperature.

Preferably, the compressor/expander subsystem 100 and the thermal storage subsystem 1120 are collectively configured so that the gas pressure at the outlet of the compressor/expander subsystem 100 is the substantially the same as the pressure of the compressed gas within the accumulator 12 and that the operating pressure of the systems 10A and 10B and others is greater than the vapour pressure of the water contained within the storage reservoir 1610 at its storage temperature.

Optionally, the compressor/expander subsystem 100 and the thermal storage subsystem 1120 can also be configured so that the gas pressure at the outlet of at least two of the compression stages and preferably at the outlet of each of the three compressions stages of the compressor/expander subsystem 100 is equal to or greater than the vapour pressure of the fluid contained within the storage reservoir 1610 at its storage temperature.

This may help facilitate the use of different types of heat exchangers within the thermal storage subsystem 1120, such as direct contact heat exchangers in which the gas in the gas flow path is introduced into direct physical contact with the water in the thermal storage subsystem 1120, as the operating pressure within such heat exchangers may be sufficient to inhibit boiling of the water in the thermal storage subsystem 1120 while heat transfer is occurring. Optionally, different types of heat exchangers 1635 can be used at locations within the thermal storage subsystem 1120. For example, a tube and shell heat exchanger may be used in association with the first compression stage (which is likely to be at the lowest operating pressure) while direct contact heat exchangers are used in association with the second and third compressions stages in which both the inlet and outlet pressures of the compression stages can be greater than the boiling pressure of the thermal storage liquid (water) at its thermal storage temperature.

Although the desired thermal storage temperature may vary depending on the choice of thermal storage liquid and its vapour pressure at the thermal storage temperature, the thermal storage temperature may be, in some examples, between about 150 degrees Celsius and about 350 degrees Celsius, and may be between about 175 and about 300 degrees Celsius, and between about 200 and 250 degrees Celsius. This lower and upper limit on the thermal storage liquid is with regard to feasibility of the system, as lower temperatures may have a significant impact on the amount of thermal energy that can be stored in a given volume while higher temperatures may be difficult to maintain with regards to storage pressure and thermal insulation.

Referring again to FIG. 7, in this embodiment, the first stage of the compression/expansion subsystem 100 may include a first compressor 112a and a first expander 116a (which is actually the last expander in the flow order of the air flow path as air is being discharged from the cavern). The thermal storage subsystem 1120 includes, in this embodiment, a corresponding heat exchanger 1635a that may be used during both the compression and expansion stages of the first compressor 112a and first expander 116a. The second stage of compression/expansion may include a second compressor 112b and a second expander 116b. The thermal storage subsystem 1120 includes, in this embodiment, a corresponding second heat exchanger 1635b that may be used during both the compression and expansion stages of the second compressor 112b and second expander 116b. The third stage of compression/expansion may include a third compressor 112c and a third expander 116c. The thermal storage subsystem 1120 includes, in this embodiment, a corresponding third heat exchanger 1635c which may be used during both the compression and expansion stages of the third compressor 112c and third expander 116c.

The three compression/expansion stages of this embodiment 112a-112c and corresponding heat exchangers 1635a-1635c may be arranged in sequence/series such that when the compression/expansion subsystem 100 (and the overall system 10) is operated in its compression/charging mode air may move sequentially through the first compressor 112a and first heat exchanger 635a, to the second compressor 112b and second heater exchanger 635b, to the third compressor 112c and third heat exchanger 635c, then on to the accumulator 12.

Alternatively, when the compression/expansion subsystem 100 is in its expansion/discharging mode, air may be removed from the accumulator 12 and conveyed sequentially through the third heat exchanger 635c and third expander 116c, to the second heat exchanger 635b and second expander 116b, to the first heat exchanger 635a and first expander 116a.

As further shown in FIG. 7, the thermal storage subsystem 1120 that is used with the compression/expansion subsystem 100 may include a cold fluid source reservoir 1606 that includes a tank 1703 and a hot fluid storage reservoir 1610 that includes a tank 1701. During compression/charging operations, relatively cooler fluid 1704 from the cold fluid storage chamber 1703 may be directed through each of the three heat exchangers 1635a, 1635b, and 1635c, where the relatively cooler fluid will absorb heat/thermal energy from the gas stream passing through each heat exchanger and the resulting, relatively warmer liquid 1702 will be sent from the outlet of each heat exchanger 1635a, 1635b, and 1635c to a thermal storage reservoir that is provided in the form of a common hot liquid storage tank 1701. In this embodiment, each of the three heat exchangers 1635a, 1635b, and 1635c will be configured to operate under substantially analogous conditions i.e., each heat exchanger may be configured to transfer about the same amount of heat to/from the compressed gas and thermal storage liquid (e.g. water) passing through the exchanger. Configuring the heat exchangers 1635a, 1635b, and 1635c to operate under analogous conditions may help facilitate an arrangement in which heat exchanger 1635a, 1635b, and 1635c can be provided with incoming, relatively cool liquid a common liquid source reservoir 1606 (i.e. tank 1703 and associated piping network) and may also help facilitate an arrangement in which the relatively warmer water exiting each heat exchanger 1635a, 1635b, and 1635c has been heated to substantially the same exit temperature, and can be collected via a common piping network and stored in a common thermal storage reservoir 1610 (e.g. the tank 1701). This can also allow the relatively warm water to be drawn from the common storage reservoir 1606 and supplied as the relatively warm inlet fluid to the heat exchanger 1635a, 1635b, and 1635c and used to re-heat the gas exiting the accumulator 12 during the expansion or discharging operating mode.

Figure 8:
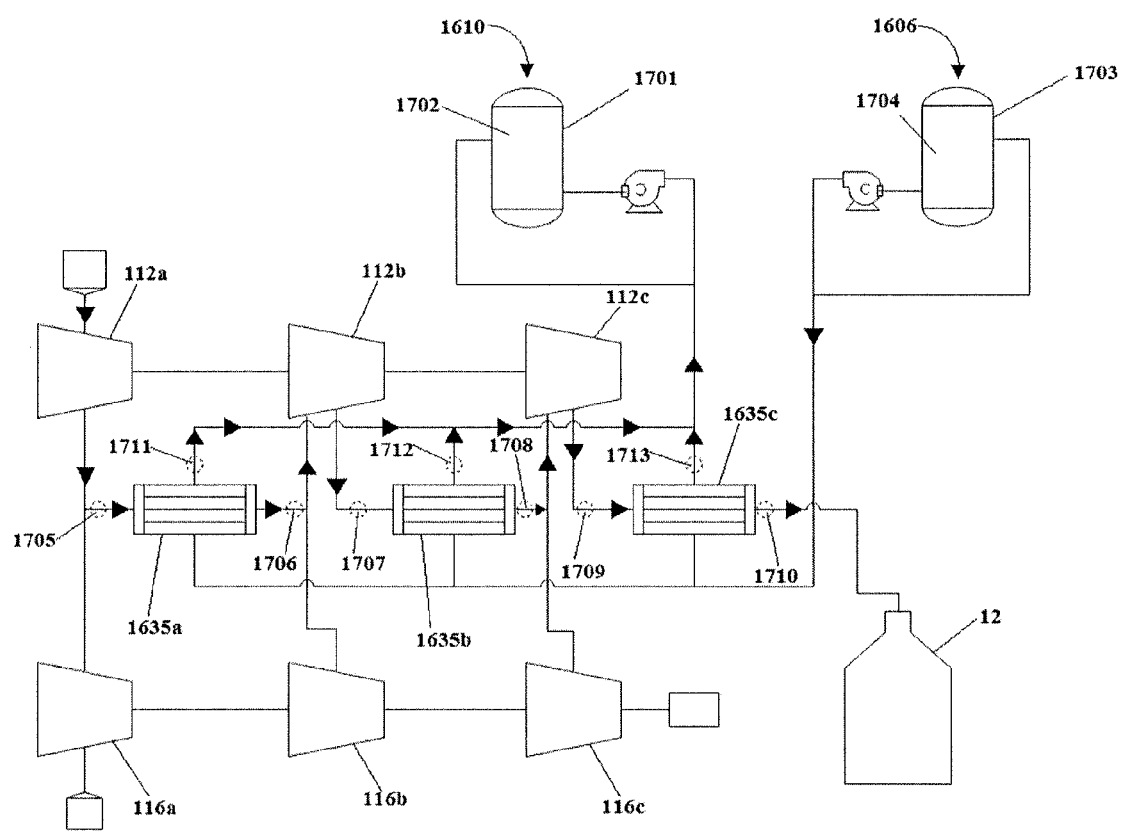
FIG. 8 is a schematic view of components of the three-stage compressor/expander subsystem of FIG. 7, showing airflow during a compression (charging mode) from the ambient through multiple compressors and respective stages of a thermal storage subsystem.

FIG. 8 is a schematic view of components of the three-stage compressor/expander subsystem with three corresponding heat exchangers of FIG. 7, showing airflow during a compression (charging) mode. In this mode, ambient air may be conveyed through the first compressor 112a and then into the first heat exchanger 635a with a specific set of gas inlet conditions at 1705.

In certain preferred embodiments the inlet gas pressure at 1705 (e.g. the inlet of the heat exchanger 1635a which is also the outlet conditions from compressor 112a) may be around 2-5 bar and is around a third of the ratiometric pressure rise to the accumulator pressure (i.e. the accumulator pressure to the power of ⅓) and the inlet gas temperature may be at or around 150-300 Celsius. As the gas with inlet conditions 1705 passes through the first heat exchanger 1635a, relatively cooler fluid 1704 from the source reservoir 1703 may be passed through a liquid inlet of the first heat exchanger 1635a and may interact, directly or indirectly, with the gas travelling between the first and second compression stages such that the gas transfers heat to the cold fluid 1704. The resulting warmer fluid 1702 will have a set of fluid outlet conditions at the liquid outlet 1711, including having a first liquid temperature that may be between about 150-300 degrees Celsius, of the first heat exchanger 1635a and may then be transferred to a hot storage reservoir 1610.

Gas exiting the first heat exchanger 1635a will also have a set of gas outlet conditions at the gas outlet of the 1706 such that the outlet gas pressure at 1706 is about the same as the gas inlet pressure at the gas inlet 1705, and the gas outlet temperature at the gas outlet 1706 is lower that the gas temperature at the gas inlet 1705 and may be between the ambient air temperature and about 50 Celsius. Gas exiting the first heat exchanger 1635a may then be conveyed through the second compressor 112b and then into the second heat exchanger 1635b with a set of gas inlet conditions at the second gas inlet 1707. In certain preferred embodiments, as a result of further gas compression from the second compressor 112b, the inlet gas pressure at the gas inlet 1707 may be around 5-25 bar and is around two-thirds of the ratiometric pressure rise to the accumulator pressure (i.e. the accumulator gauge pressure to the power of ⅔) and the inlet gas temperature at the gas inlet 1707 may be at or around 150-300 Celsius. As the gas with conditions at gas inlet 1707 passes through the second heat exchanger 1635b, cooler fluid from a source reservoir 1606 is provided via the second liquid inlet and can then be passed through the second heat exchanger 1635b and interact, directly or indirectly with the gas such that the gas may transfer heat to the cooler fluid. The resulting warmer fluid will have a specific set of conditions (outlet temperature and outlet pressure) at the second liquid outlet 1712, including having a second liquid temperature that may be between about 150-300 degrees Celsius, and may then be transferred to a hot storage reservoir 1610. Preferably, conditions at the second liquid outlet 1712 of the second heat exchanger 1635b will be at about the same as the conditions at the liquid outlet 1711 of the first heat exchanger 1635a.

Gas exiting the gas outlet 1708 of the second heat exchanger 1635b will have specific set of gas outlet conditions such that the outlet gas pressure at the outlet 1708 is about the same as the pressure at the gas inlet 1707, and the temperature at the gas outlet 1708 is expected to be lower that the temperature at the gas inlet 1707 and be between the ambient air temperature and about 50 Celsius. Gas exiting the second heat exchanger 1635b may then be conveyed through the third compressor 112c and then into the third heat exchanger 1635c with a specific set of conditions at the third gas inlet 1709. In certain preferred embodiments, as a result of further gas compression from the third compressor 112c, the pressure at the gas inlet 1709 may be at or around the magnitude of the desired pressurized gas in the accumulator 12 and the temperature at the gas inlet 1709 may be at or 150-300 Celsius.

As the gas moves from the gas inlet 1709 and passes through the third heat exchanger 1635c, cooler fluid 1704 from the source reservoir 1606 may be passed through the third heat exchanger 1635c and interact, directly or indirectly the gas such that the gas may transfer heat to the cooler fluid 1704. The resulting warmer fluid 1702 will have a set of conditions at the third liquid outlet 1713, including having a liquid temperature that may be between about 150-300 degrees Celsius, and may then be transferred to a hot storage reservoir 1610. Preferably, the warmer fluid 1702 at the liquid outlet 1713 of the third heat exchanger 1635c will be at about the same temperature as the warmer fluid 1702 at the liquid outlets 1711 and 1712 of the first and second heat exchangers, 1635a and 1635b, respectively.

Gas exiting the third heat exchanger, via its gas outlet 1710 will have specific set of gas outlet conditions such that the outlet gas pressure is about the same pressure as the desired pressurized gas in the accumulator 12, and the gas outlet temperature at 1710 is lower than the gas inlet temperature at inlet 1709 and be between the ambient air temperature and about 50 Celsius. Gas exiting the third heat exchanger 1635c may then be conveyed to the accumulator 12.

In this three-stage embodiment, it is preferred that the pressure of the gas as it exits at least one of the three heat exchangers 1635a, 1635b, and 1635c, (i.e. gas outlets 1706, 1708 and 1710) be greater than or equal to the boiling/vapour pressure of the fluid in the storage reservoir 1610. By way of non-limiting example, when water is used as the thermal storage fluid 1701, it is preferred that the gas outlet pressure for at least one of, and preferably a two or more or all three of, the gas outlets 1706, 1708 and 1710 be greater than the vapor pressure of water at its storage temperature (i.e. its average temperature at the liquid outlets 1711, 1712 and 1713). Maintaining these outlet pressures may allow an operator of the compressed gas energy storage system to use water as a thermal storage fluid while maintaining desirable conditions of water (i.e., not allowing the water to boil).

Figure 9:
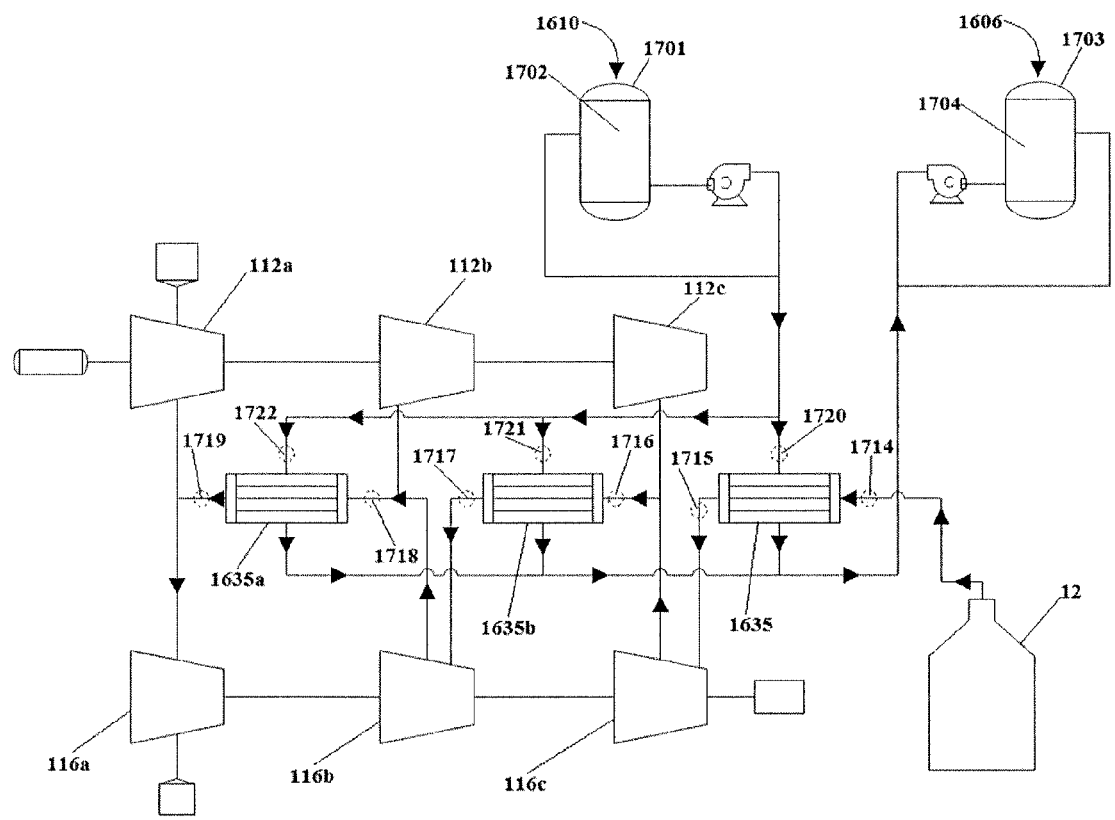
FIG. 9 is a schematic view of components of the three-stage compressor/expander subsystem of FIG. 7, showing airflow during an expansion (discharging mode) phase from storage through three expanders and respective stages of a thermal storage subsystem.

FIG. 9 is a schematic view of components of the three-stage compressor/expander subsystem with three corresponding heat exchangers 1635a, 1635b and 1635c of FIG. 7, showing airflow during an expansion (discharging) mode from storage through multiple expander stages and multiple respective heat exchangers of the thermal storage subsystem.

In this mode, air may be conveyed from the accumulator 12 to the third heat exchanger 1635c with a specific set of conditions at the discharge mode gas inlet 1714 (which is the gas outlet when in the charging mode). As the gas passes through the third heat exchanger 1635c, relatively warmer fluid 1702 from a thermal storage reservoir 1610 enters via the discharge liquid inlet 1720 and has an inlet temperature and may be passed through the third heat exchanger 1635c and interact, directly or indirectly with the gas such that the hot fluid transfers heat to the gas before it enters the third expander 116c. The resulting cooler fluid 1704 may then exit the third heat exchanger 1635c and be transferred to a source reservoir 1606. By way of non-limiting example, the temperature of hot fluid at fluid inlet 1720 may be less than the boiling point of the hot fluid 1702 when at its storage pressure.

Gas exiting the third exchanger 1635c when in the discharge mode will have set of conditions at gas outlet 1715 such that the outlet gas pressure at 1715 is about the same as the gas inlet pressure at 1714 and the gas outlet temperature at 1715 is higher than the gas inlet temperature at 1714 and is as near to the fluid storage temperature as the heat exchangers will facilitate, preferably within 5-15 degrees Celsius or less. Gas exiting the third heat exchanger 1635c may then be conveyed through the third expander 116c and then into the second heat exchanger 1635b with a specific set of conditions at discharge gas inlet 1716. In certain preferred embodiments gas exiting the first expander 116c may have a resulting pressure at 1716 of around 5-25 bar and is around a third of the ratiometric pressure reduction from the accumulator pressure to ambient pressure (i.e. the accumulator gauge pressure to the power of $2/3$) and an inlet gas temperature at 1716 of around 30-70 Celsius.

As the gas passes from inlet 1716 through the second heat exchanger 1635b, warmer fluid 1702 from a storage reservoir 1610 can enter via warm liquid inlet 1721 may be passed through the second heat exchanger 1635b and interact, directly or indirectly with the gas such that the warmer fluid 1702 transfers heat to the gas. The resulting cooler fluid 1704 may then be transferred to a cold source reservoir 1606. By way of non-limiting example, the temperature of the liquid entering via the liquid inlet 1721 may be less than that of the boiling point of the liquid 1702 at the storage pressure and the inlet pressure 1721 may be at or about 14-25 bar.

Gas exiting the second heat exchanger 1635b will have specific set of conditions at discharging gas outlet 1717 such that the outlet gas pressure at 1717 is about the same as the gas inlet pressure at 1716 and the gas outlet temperature at 1717 is higher than the gas inlet temperature at 1716 and as near to the fluid storage temperature as the heat exchangers will facilitate, preferably within 5-15 degrees Celsius or less. Gas exiting the second heat exchanger 1635b may then be conveyed through the second expander 116b and then into the first heat exchanger 1635a with a set of inlet conditions at liquid inlet 1718. In certain preferred embodiments gas exiting the second expander 116b may have a resulting pressure at 1718 of around 2-5 bar and is around two-thirds of the ratiometric pressure reduction from the accumulator pressure to ambient pressure (i.e. the accumulator gauge pressure to the power of $1/3$) and an inlet gas temperature at 1718 of around 30-70 Celsius or lower.

As the gas flows from the inlet 1718 through the first heat exchanger 1635a, warmer liquid 1702 from the storage reservoir 1610 can enter via liquid inlet 1722 having inlet conditions and may be passed through the first heat exchanger 1635a to interact with, directly or indirectly with the gas such that the warmer fluid 1702 transfers heat to the gas. The resulting cooler fluid 1704 may then be transferred to the source reservoir 1606. By way of non-limiting example, the fluid inlet temperature of warmer liquid at 1722 may be less than that of the boiling point of the warmer liquid 1702 at the storage pressure and the inlet pressure of the warmer liquid at 1722 may be at or about 14-25 bar.

Gas exiting the first heat exchanger 1635a, via gas outlet 1719 will have outlet conditions such that the outlet gas pressure at 1719 is approximately equal to the inlet gas pressure at 1718 and the gas outlet temperature at 1719 is higher than the gas inlet temperature at 1717 and is as near to the fluid storage temperature as the heat exchangers will facilitate, preferably within 5-15 degrees Celsius or less. The gas may then be routed through the first expander 116a.

Gas exiting the first expander 116a will have outlet conditions such that the outlet gas is at approximately atmospheric pressure. The gas may then be routed back to the atmosphere or alternatively mat be routed to a gas storage facility.

A three stage compression/expansion subsystem with three (or more) corresponding thermal exchange points, such as those embodiments shown in FIGS. 7-9 may have one or more potential advantages over other compression/expansion subsystems.

For example, one potential benefit of a three (or more)-stage compression/expansion subsystem with three (or more) corresponding thermal exchange points may be the ability to construct the compressed gas accumulator at greater depths. This is primarily beneficial for larger systems, where the most economical construction depth is greater than 350 m. Constructing the accumulator at depths greater than ~350 m may not be generally feasible when using a two-stage compression/expansion subsystem due to the relatively higher gas temperatures that would be created at each of the compressor outlets (as a result of the larger pressure change utilized per compression stage), and possibly the limited number (if any) of compressor vendors capable of producing such a machine. Constructing at greater depths may provide an advantage for HC-A-CAES systems, as the energy density of the accumulator volume increases with depth (i.e. the same amount of energy can be stored in a smaller volume at greater depths), reducing the accumulator development cost and construction duration.

Another possible additional benefit of this three (or more)-stage system may be that the temperature at which hot thermal liquid 1702 is stored is lower than the temperature which it would be stored at if using a two-stage compression/expansion subsystem. In particular, when water is used as the thermal fluid 1702/1704, a benefit may be conferred with the specific temperature reduction in the switch from two to three heat exchangers. For example, the hot storage temperature of the water may be reduced to a temperature such that its vapour pressure (boiling pressure) is less than the maximum pressure of standard pressure vessels. This enables the storage reservoir 1610 to utilize commonly available pressure vessels, such as bullet or spherical tanks. This eliminates the need for advanced storage reservoir design and reduces storage reservoir costs and procurement times. Additionally, for systems where water is not to be used as the thermal storage media, the lower temperature of thermal fluid associated with 3 or more stage system allows for a greater variety of heat transfer fluids to be considered, such as mineral oils and other heat transfer fluids which may not be stable at the temperatures associated with a 2 stage system.

Another possible benefit of some embodiments of three (or more)-stage systems as described herein is that it may allow for a wide range of construction depths at which the storage reservoir 1610 may be constructed underground if desired. For certain relatively large systems (>100 MW), pump flow rate limitations may make the use of down-hole pumps less desirable as the pumping solution for moving thermal fluid from an underground source or storage reservoir 1606 or 1610 to the surface. Thus, for such large systems with an underground source or storage reservoir, there are a limited number of options for pumping fluid to the surface. One option may be to construct a pumping gallery underground. Another option may be to utilize top-side pumps. Since building a pumping gallery underground is expensive, and maintenance of this pumping gallery would be time and cost prohibitive, utilizing top-side pumps would likely be preferable over a pumping gallery. However, the top-side pump approach is challenging to implement if the underground storage reservoir 1610 is sufficiently pressurized such that the fluid pressure remains above its boiling pressure at the hot storage temperature when travelling from the storage reservoir 1610 to the surface. Another limitation which is considered when choosing the depth of thermal storage cavern is the fracture pressure of the rock: the storage reservoir 1610 pressure should be kept below the lithostatic gradient to reduce the risk of rock fracture. As the storage chamber may be operated a lower pressure for a three (or more) stage system than would be required for a two stage system, the chamber may be located across a wider range of shallow depths while still remaining below the fracture pressure.

While illustrated as above ground tanks/containers, one or both of the source reservoir 1606 and storage reservoir 1610 may be located underground (or at least partially underground) and may have different, physical arrangements. For example, one or both of the source reservoir 1606 and storage reservoir 1610 may be configured to include caverns (lined or unlined) and/or may be provided by repurposed parts of the system 10 that can be adapted to hold pressurized water at the desired storage temperature and pressure.

While in the embodiment of FIGS. 7-9 the compressors 112 and expanders 116 are shown as separate devices, in other embodiments the system 10 may include combined apparatuses that can function in both compressor and expander modes if suitable.

What has been described above has been intended to be illustrative of the invention and non-limiting and it will be understood by persons skilled in the art that other variants and modifications may be made without departing from the scope of the invention as defined in the claims appended hereto.

We claim:

1. A method of temporarily storing thermal energy via a thermal storage subsystem in a compressed air energy storage system comprising an accumulator disposed at least 300 m underground and having an interior configured to contain compressed air at an accumulator pressure that is at least 20 bar and a gas compressor/expander subsystem in communication with the accumulator via an air flow path for conveying compressed air to the accumulator when in a charging mode and from the accumulator when in a discharging mode, the method comprising, when in the charging mode:
 a) providing each of a first heat exchanger, a second heat exchanger, and a third heat exchanger with a thermal storage liquid from a common liquid reservoir;
 b) introducing air into an inlet of the air flow path and compressing the air to a first pressure using a first compressor in the air flow path;
 c) transferring a first amount of thermal energy from the air to a first flow of thermal storage liquid via the first heat exchanger whereby the thermal storage liquid is heated to a first liquid temperature when exiting the first heat exchanger;
 d) compressing the air to a second pressure and a second temperature using a second compressor downstream from the first compressor in the air flow path;
 e) transferring a second amount of thermal energy from the air to a second flow of thermal storage liquid via the second heat exchanger whereby the second flow of thermal storage liquid is heated to a second liquid temperature when exiting the second heat exchanger;
 f) compressing the air to substantially the accumulator pressure and a third temperature using a third compressor downstream from the second compressor in the air flow path;
 g) transferring a third amount of thermal energy from the air to a third flow of thermal storage liquid via the third heat exchanger whereby the third flow of thermal storage liquid is heated to a third liquid temperature when exiting the third heat exchanger;
 h) collecting the first flow of thermal storage liquid, the second flow of thermal storage liquid, and the third flow of thermal storage liquid via a common piping network and storing the first flow of thermal storage liquid, the second flow of thermal storage liquid, and the third flow of thermal storage liquid in a thermal storage reservoir at a storage temperature that is substantially equal to or less than a highest of the first, second, and third liquid temperatures and at a storage pressure that is greater or substantially similar to a boiling pressure of the thermal storage liquid at the storage temperature; and
 i) conveying air exiting the third heat exchanger into the accumulator.

2. The method of claim 1 further comprising, when in the discharging mode:
 j) withdrawing air from the accumulator at substantially the accumulator pressure;
 k) reintroducing thermal energy from a first portion of the stored thermal storage liquid into the air thereby raising the air temperature;
 l) expanding the heated air to a third pressure to drive a first expander;
 m) reintroducing thermal energy from a second portion of the stored thermal storage liquid into the air exiting the first expander thereby raising the air temperature;
 n) expanding the heated air to a fourth pressure to drive a second expander;
 o) reintroducing thermal energy from a third portion of the stored thermal storage liquid into the air exiting the second expander thereby raising the air temperature; and
 p) expanding the heated air to a fifth pressure to drive a third expander.

3. The method of claim 2, wherein k) is performed using the third heat exchanger, m) is performed using the second heat exchanger, and o) is performed using the first heat exchanger.

4. The method of claim 2, wherein the first pressure is substantially equal to the fourth pressure and the second pressure is substantially equal to the third pressure.

5. The method of claim 1, further comprising pressurizing the thermal storage reservoir to the storage pressure using the thermal storage fluid in its gaseous state.

6. The method of claim 1, wherein the accumulator pressure is between 30 bar and 80 bar.

7. The method of claim 1, wherein the storage pressure is between 10 bar and 20 bar.

8. The method of claim 1, wherein the storage temperature is between 150 and 300 degrees Celsius.

9. The method of claim 1, wherein the accumulator comprises a hydrostatically compensated accumulator containing a layer of compensation liquid beneath a layer of the compressed air and further comprising:
   a) when in the charging mode, conveying compressed gas into the accumulator and displacing a corresponding volume of compensation liquid from the layer of compensation liquid out of the accumulator toward a compensation liquid reservoir via a compensation liquid flow path thereby maintaining the layer of compressed air at substantially the accumulator pressure during the charging mode; and
   b) when in the discharging mode, conveying compressed gas from the accumulator by providing a corresponding volume of compensation liquid into the accumulator as the compressed air is removed thereby maintaining the layer of compressed air at substantially the accumulator pressure during the discharging mode.

10. The method of claim 1, wherein the thermal storage reservoir comprises a storage vessel and wherein the storage pressure is less than a rated pressure of the storage vessel.

11. A compressed air energy storage system operable in at least a charging mode and a discharging mode, the system comprising:
   a) an accumulator comprising a chamber disposed at least 300 m underground and having an accumulator interior configured to contain compressed air at a accumulator pressure when in use;
   b) a three-stage gas compressor/expander subsystem in fluid communication with the accumulator interior via an air flow path and configured to convey a flow of compressed air into the accumulator when in the charging mode and out of the accumulator when in the discharging mode; the three-stage gas compressor/expander subsystem comprising:
      i. a first compressor in the air flow path, a second compressor downstream from the first compressor and a third compressor downstream from the second compressor wherein compressed gas exiting the third compressor is substantially equal to the accumulator pressure and flows into the accumulator for storage in the charging mode;
   c) a three-stage thermal storage subsystem having a liquid flow path configured to circulate a thermal storage liquid between a source reservoir and a thermal storage reservoir, the three-stage thermal storage subsystem comprising:
      i. a first heat exchanger in the liquid flow path and in the air flow path between the first compressor and second compressor to transfer a first amount of thermal energy from the air to a first flow of thermal storage liquid;
      ii. a second heat exchanger in the liquid flow path and in the air flow path between the second compressor and third compressor to transfer a second amount of thermal energy from the air to a second flow of thermal storage liquid; and
      iii. a third heat exchanger in the liquid flow path and in the air flow path between the third compressor and the accumulator to transfer a third amount of thermal energy from the air to a third flow of thermal storage liquid;
      wherein, when in use, the thermal storage liquid from the source reservoir is directed to each of the first heat exchanger, the second heat exchanger, and the third heat exchanger; and
      the first flow of thermal storage liquid, the second flow of thermal storage liquid, and the third flow of thermal storage liquid respectively exiting the first heat exchanger, the second heat exchanger, and the third heat exchanger are each collected via a common piping network and stored in the thermal storage reservoir.

12. The system of claim 11 wherein when in the charging mode, the thermal storage subsystem is configured such that the first flow, second flow, and third flow of thermal storage liquid are conveyed towards and retained within the thermal storage reservoir at a storage pressure and at a storage temperature, wherein the storage pressure is greater than atmospheric pressure and the storage temperature is greater than a boiling temperature of the thermal storage liquid when at atmospheric pressure and is less or substantially equal to the boiling temperature of the thermal storage liquid when at the storage pressure.

13. The system of claim 11, wherein the first heat exchanger, the second heat exchanger, and the third heat exchanger are configured such that the thermal storage liquid exiting the first heat exchanger, the thermal storage liquid exiting the second heat exchanger, and the thermal storage liquid exiting the third heat exchanger are at substantially the storage temperature.

14. The system of claim 11 wherein the first compressor, the second compressor, and the third compressor are configured such that a first exit temperature of the gas exiting the first compressor is between 150 and 300 degrees Celsius, a second exit temperature of the gas exiting the second compressor is between 150 and 300 degrees Celsius, and a third exit temperature of the gas exiting the third compressor is between 150 and 300 degrees Celsius.

15. The system of claim 11, wherein the thermal storage subsystem is configured such that the storage temperature is between 150 and 300 degrees Celsius and the gas compressor/expander subsystem is configured such that the accumulator pressure is between 30 bar and 80 bar.

16. The system of claim 11, wherein, when in the charging mode:
   a) a first amount of thermal energy is transferred from the gas to the thermal storage liquid via the first heat exchanger;
   b) a second amount of thermal energy is transferred from the gas to the thermal storage liquid via the second heat exchanger; and
   c) a third amount of thermal energy is transferred from the gas to the thermal storage liquid via the third heat exchanger, and wherein the first heat exchanger, the second heat exchanger, and the third heat exchanger are configured such that the first amount, second amount, and third amount are all within 30% of each other.

17. The system of claim 11, wherein the first heat exchanger, the second heat exchanger, and the third heat exchanger are configured such that a first exit temperature of the thermal storage liquid exiting the first heat exchanger, a second exit temperature of the thermal storage liquid exiting the second heat exchanger, and a third exit temperature of the thermal storage liquid exiting the third heat exchanger are each between 90% and 110% of the storage temperature.

18. The system of claim 11, wherein the thermal storage liquid comprises at least one of water, mineral oil, synthetic oil, and a combination thereof.

19. The system of claim 11, where the three-stage gas compressor/expander subsystem further comprises at least a first expander in the airflow path and configured to be driven by gas exiting the accumulator and to drive at least a first generator to generate electricity when in the discharging mode.

20. The system of claim 11, wherein the accumulator comprises an underground hydrostatically compensated accumulator configured to contain a layer of compensation liquid beneath a layer of the compressed gas at the accumulator pressure.

21. The system of claim 20, further comprising a compensation liquid reservoir spaced apart from the accumulator and in fluid communication with the layer of compensation liquid within the accumulator via a compensation liquid flow path compensation whereby liquid can flow between the accumulator and the compensation liquid reservoir when in use, wherein
   d) during the charging mode the compressed air enters the accumulator at the accumulator pressure which displaces a corresponding volume of compensation liquid from the layer of compensation liquid out of the accumulator via the compensation liquid flow path thereby maintaining the layer of compressed air at substantially the accumulator pressure during the charging mode; and
   e) during the discharging mode the compensation liquid re-enters the accumulator via the compensation liquid flow path as air is removed from the accumulator thereby maintaining the layer of compressed air at substantially the accumulator pressure during the discharging mode.

22. The system of claim 11, wherein the thermal storage reservoir comprises a storage vessel and wherein the storage pressure is less than a rated pressure of the storage vessel.

23. The system of claim 11, wherein the storage reservoir is pressurized to the storage pressure by boiling or evaporating of the thermal fluid within the storage reservoir.

* * * * *